United States Patent [19]

Schuchman et al.

[11] Patent Number: 5,798,726
[45] Date of Patent: *Aug. 25, 1998

[54] AIR TRAFFIC SURVEILLANCE AND COMMUNICATION SYSTEM

[75] Inventors: Leonard Schuchman, Potomac, Md.; Ronald Bruno, Arlington, Va.; John Kefaliotis, McLean, Va.; Steve Greenberg; Edward J. Zakrzewski, both of Reston, Va.

[73] Assignee: Stanford Telecommunications, Inc., Reston, Va.

[*] Notice: The term of this patent shall not extend beyond the expiration date of Pat. No. 5,459,469.

[21] Appl. No.: 682,546

[22] PCT Filed: Feb. 3, 1995

[86] PCT No.: PCT/US95/01187

§ 371 Date: Jan. 24, 1997

§ 102(e) Date: Jan. 24, 1997

[87] PCT Pub. No.: WO95/21388

PCT Pub. Date: Aug. 10, 1995

Related U.S. Application Data

[72] Continuation-in-part of Ser. No. 192,327, Feb. 4, 1994, Pat. No. 5,459,469.

[51] Int. Cl.$^6$ .............................. G01S 13/93; G01S 13/74
[52] U.S. Cl. ..................... 342/37; 342/32; 342/36
[58] Field of Search .................... 342/29, 32, 36, 342/37, 38, 43

[56] References Cited

U.S. PATENT DOCUMENTS 3,495,260 2/1970 Laughlin et al. ...................... 342/36
4,060,805 11/1977 McComas ........................... 342/38
4,359,733 11/1982 O'Neill ............................. 342/36
5,459,469 10/1995 Schuchman et al. .................... 342/37

Primary Examiner—Ian J. Lobo
Attorney, Agent, or Firm—Jim Zegeer, Esq.

[57] ABSTRACT

Air traffic surveillance and communication system for air traffic controllers includes a plurality of ground based first digital radio transceivers, each first digital radio transceiver being located in specific geographic sectors, respectively, and having a first frequency channel for supporting party-line digital voice, and a second frequency channel dedicated to supporting a digital data channel for down-linking dependent surveillance data and for both up-link and down-link data communications. The first and second frequency channels are paired such that each time a frequency change is commanded by the ground both the first and second frequency channels will be automatically tuned to a new air-ground frequency pair. A plurality of aircraft based second digital radio transceivers are provided, one located in each aircraft, each second radio transceiver having corresponding first and second frequency channels, a navigational data source on each aircraft, said navigational data source including a GPS receiver system for producing aircraft navigation data selected from aircraft latitude, longitude, altitude, speed, heading and glide. The navigational data source is coupled to the respective aircraft transceiver for transmission on the second channel to at least one of the plurality of ground based first radio transceivers. Each ground based first radio transceiver has a communication controller for formatting up-link data and separating down-linked surveillance data and disseminating same to air traffic controllers in the sectors of the aircraft.

8 Claims, 11 Drawing Sheets

| User Surveillance Burst | | | | |
|---|---|---|---|---|
| Acquisition OH | (msec) | | bits | |
| Guard band (no xmit) | 8.75 | 5.00 | 126 | 72 |
| Xmit ramp (xmit ramp up time) | | 2.50 | | 36 |
| Bit sync (0101 pattern) | | 1.25 | | 18 |
| Burst sync (Barker code) | | 0.68 | | |
| Surveillance Information | 10.42 | | 200 | |
| User ID | | .68 | | |
| Latitude | | 1.25 | | 24 |
| Longitude | | 1.25 | | 24 |
| Altitude | | 1.25 | | 24 |
| Speed | | 0.83 | | 16 |
| Heading | | 0.42 | | 8 |
| Glide | | 0.42 | | 8 |
| Reserved | | 0.42 | | 8 |
| CRC check | | 2.92 | | 56 |
| Room for Expansion | | | | 34 |
| Control Information RS(63,39) | | 1.67 | 144 | |
| Data Channel reservation etc | | | 112 | |
| CRC check | | 5.00 | | 96 |
| Channel Coding OH | 10.00 | 0.83 | 192 | 16 |
| Total Information Burst | 26.25 | | 504 | |
| Total User Slot Size | 35.00 | | 672 | |

FIG. 5

| Primitive | | Parameters |
|---|---|---|
| SN-UNITDATA | Request | SN-Source-Address |
| | Indication | SN-Destination-Address |
| | | SN-Quality-of-Service |
| | | SN-Userdata |
| | | Expedited Service |

FIG. 14

AIR TRAFFIC SURVEILLANCE AND COMMUNICATION SYSTEM

This is a continuation-in-part of application Ser. No. 192,327, filed Feb. 4, 1994, now U.S. Pat. No. 5,459,469.

BACKGROUND AND BRIEF DESCRIPTION OF THE INVENTION

Central to the provision of Air Traffic Control (ATC) services within the National Airspace System (NAS) are three major functions; these are navigation, surveillance and communications. Navigation allows aircraft to navigate along assigned routes. Surveillance allows the collection of information as to aircraft position. Air-ground communications facilitates the delivery of ATC instructions to airborne pilots, and the receipt of data and requests from pilots. The NAS has an extensive existing infra-structure to support these major ATC functions.

To support navigation the nation is covered with a network 959 VHF Omnidirectional Ranges (VOR). VORs provide the signals in space which are the principal support for aircraft navigation in the enroute and terminal environments. VORs are supplemented with Distance Measuring Equipment (DME), LORAN C, and to an increasing extent the Global Positioning System (GPS). To support instrument landing approach navigation, the nation's airports are equipped with 797 Instrument Landing Systems.

Surveillance needs are met by the maintenance of a network of primary and secondary radar systems. This network is made up of 298 primary radars and associated secondary radar sensors and approximately 30 secondary radar-only surveillance sites.

The air-ground communication function is supported through a network of VHF and UHF radios with terminations at the enroute, terminal, tower, and flight service station control positions requiring direct communications with pilots.

The ATC system supported by the navigation, surveillance, and communications infrastructure described above is the primary system used to establish and maintain safe separation between aircraft participating in the ATC system and between these aircraft and the ground. As a backup to this system, the FAA has developed and aircraft are equipping with the Traffic Alert and Collision Avoidance System (TCAS). This system uses data received from airborne transponders responding to secondary radar interrogations and is the last line of defense against unsafe air traffic situations.

While effective, the existing NAS ATC infrastructure has many problems. These problems include:

Very high level of operations and maintenance expenditure required to maintain the vast network of navigation, surveillance and air-ground radio equipments.

Insufficient spectrum is available in the VHF-band to accommodate needed requirements. Currently, this spectrum is used by air-ground radios, VORs, and the localizer component of instrument landing systems. Lack of available frequencies is becoming a limiting factor in the expansion of ATC services.

Very high replacement costs for aging surveillance, navigation, and air-ground radio components.

High channel noise experienced in current analog radio technology.

Limited capability for effective communications network management and control allowed in analog communications technology.

Limited surveillance accuracy resulting in data insufficient for the purposes of advanced ATC algorithms.

Limited directional differentiation in TCAS resulting in high false alarm rates and data not readily supportive of resolution algorithms.

Nonexistence of an air-ground data communications capability resulting in air-ground frequency congestion, high controller workload, and error prone air-ground communications.

The object of this invention is to provide an integrated ATC communications, navigation, and surveillance infrastructure to eliminate the above cited problems.

The invention is directed to an integrated communications, navigation surveillance system which overcomes the problems in the current NAS described above. A major feature of the invention is a new air-ground radio infrastructure operating in the existing VHF band: a pair of frequencies is associated with each air traffic control position. One of the frequencies will support party line voice for the air traffic sector consistent with the current ATC operational concept. The second frequency will support a data channel to be used for downlinking dependent surveillance data and for both uplink and downlink data communications consistent with current FAA two-way data link operational concepts. Frequencies will be paired so that each time a frequency change is commanded by the ground, both the voice and data channel will be tuned to the new air-ground frequency pair. In a preferred embodiment of the invention, supporting radios are to be all digital, operating with 10.0 kHz spacing. VFR aircraft not receiving ATC services will be supported with a common access channel and separate data channels to allow surveillance data collection from the aircraft without a change in the operational concepts present in today's ATC system.

The term SACOM as used herein refers to applicants' surveillance and communication system of this invention used in an air traffic control system.

The SACOM system employs dependent surveillance to provide data to meet surveillance requirements. The SACOM navigational data source will be the Global Positioning System (GPS) as augmented by the FAA to allow GPS as a sole means of navigation. The SACOM system, in a preferred embodiment employs triply redundant GPS receivers with majority voting to ensure, with high probability, that the aircraft position reported over the SACOM data channel will be suitable for air traffic control purposes. The SACOM data link structure provides for 3D position reporting with a 8.4 second surveillance update rate for up to 60 aircraft for each enroute air traffic control position and 4.2 second surveillance update for up to 30 aircraft for each terminal air traffic control position. Position reports will be made available to requiring ground systems through a terrestrial network providing for the distribution of these data. Position reports will be made available to SACAS[1] systems through RF front ends which will allow monitoring the multiple data link frequencies of interest for a given geographical area.

The SACOM system is consistent with the Data Link System (DLS) concepts and the Aeronautical Telecommunications Network (ATN) 6 [1] SACAS—air-to-air collision avoidance system which replaces TCAS. protocol architecture. Airborne components are designed to fit into modern aircraft data architectures. The principal supporting ground component in addition to the air-ground radios is the SACOM Communication Controller (SCC). This component formats uplink data and provides for the separation of downlinked surveillance data from general communications data. The surveillance data is disseminated to the requiring ATC processors in accordance with static routing tables. The DLS communications data is interfaced to the ATN at the network protocol layer via the ATN routing function.

The system of this invention solves the problems cited with the existing communications, navigation, surveillance architecture as follows:

SACOM will eliminate the need for expenditure for replacement of aging ATCBI surveillance systems.

SACOM reduces infrastructure O&M cost through the elimination of the need to maintain the extensive network of secondary surveillance sensors.

SACOM provides for high quality digital voice greatly reducing channel noise currently experienced by pilots and controllers.

SACOM allows the increased level of communication network monitoring and control facilitated by digital technology.

SACOM provides an air-ground communication sub-network capable of supporting two-way data (TWDL), flight-information-link (FIS-DL) and traffic information system data link (TIS-DL) capabilities and the ATN/ architecture framework concept.

A summary of the major technical benefits of the preferred embodiments of the invention are as follows:

10.0 Hz digital voice channels—VHF.

10.0 Hz digital 3D position reporting and data link channels.

A total number of 2900 VHF voice and data channels augment to today's 760 voice channels.

8M/2σ three dimensional accuracy for:

Surveillance everywhere.

SACAS target reports.

Terminal surface.

Faster position reporting update rate.

8.4 seconds enroute.

4.2 seconds terminal.

Data sub-netowrk on average provides 6.6 Kbps.

Data sub-network is ATN and two-way-data-link (TWDL) compatible.

In control sectors requiring greater throughput, additional data channels can be added.

Unique digital data and position reporting protocol—no garbling of position report or data anywhere.

DESCRIPTION OF THE DRAWINGS

The above and other objects, advantages and features of the invention will become more apparent when considered with the following specification and accompanying drawings wherein:

FIG. 5 is a table illustrating user surveillance burst,

FIG. 14 is a table illustrating service primitive.

DETAILED DESCRIPTION OF THE INVENTION

Figure 1:
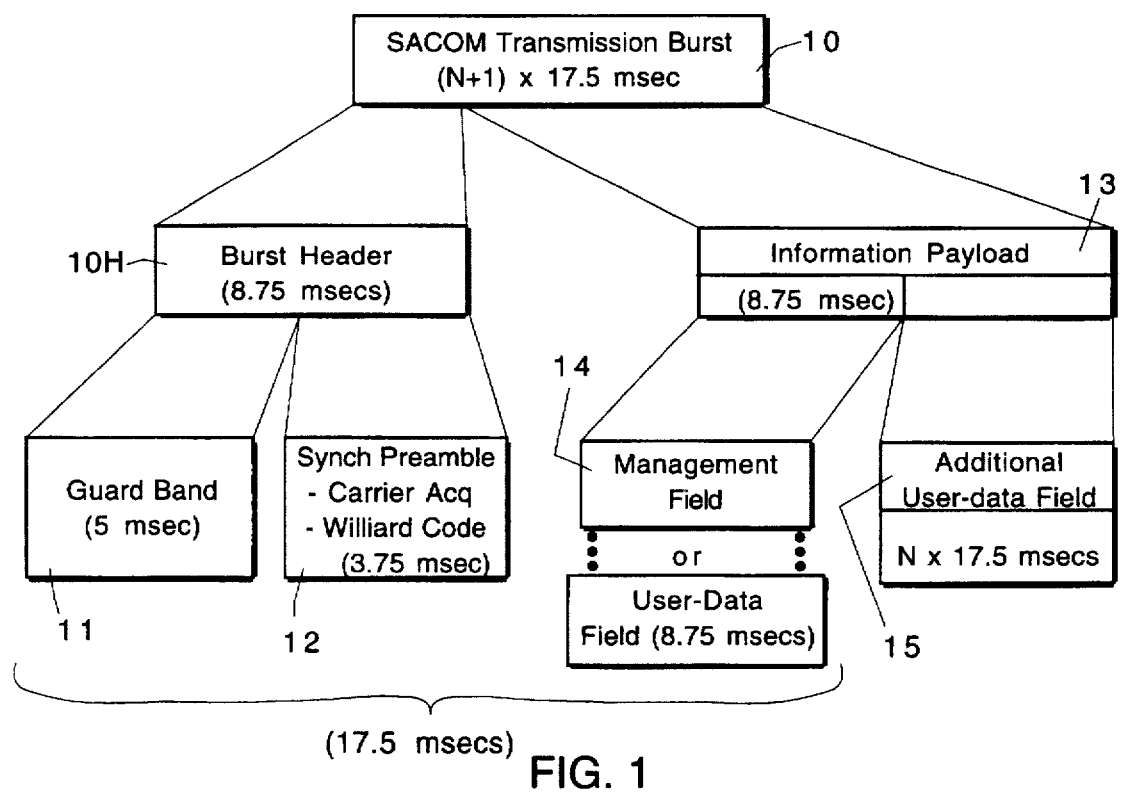
FIG. 1 illustrates the elements of the burst structure by an aircraft or ground transmitter.

The following sections provide detailed information of the elements of the invention, including the RF link design, airborne equipment, ground RF terminal equipment, the NAS supporting infrastructure required by the invention including a preferred data protocol architecture.

RADIO LINK MODULATION, PROTOCOLS, AND EQUIPMENT

Both the air-to-ground (A/G) voice and data communications sub-networks are supported by a broadcast signal over assigned radio frequencies. Each sector is assigned one (1) radio frequency for party-line voice and one (1) radio frequency for multiplexed data communications. Frequency assignments will be chosen from the current RF allocation for A/G purposes in the civilian VHF and also the military UHF bands (in a combined system). In a broadcast network such as this, each entity connected to the network (the aircraft and the ground terminal) communicates by broadcasting a signal at the designated RF frequency for the sector. Such broadcasts at the designated frequency will support air-to-ground, ground-to-air, and even air-to-air communications in a sector. Of course, simultaneous broadcasts by more than one entity will result in mutual interference and lost communications. Obviously, a coordination scheme is required to avoid such simultaneous broadcasting. For the voice channel, this coordination is provided via a listen and "push to talk" arbitration mechanism, described below. For the data channel, coordination is provided at the data link layer, through the Sub-network Access Protocol (SNAcP), described later herein.

A/G PHYSICAL LAYER

A frequency assignment for data or voice will include a center frequency and the surrounding region consistent with a 10.0 KHz spacing of assigned frequencies. With a quadrature phase shift keyed (QPSK) modulation, common in commercial digital wireless systems, a 10.0 KHz spacing will accommodate a 14.4 Kbps baseband data rate in a raised cosine filtered channel with a roll-off factor of 0.35. Channel encoding will reduce the effective data transfer rate below 14.4 Kbps depending-upon the degree of redundancy of the chosen coding scheme. To accommodate simplicity as well as rapid and robust signal acquisition at the radio receivers a differential QPSK (DQPSK) signal modulation is preferred.

All data and voice communications in a sector are thus supported by short RF broadcasts (referred to as transmission bursts) by an aircraft or ground transmitter, and the subsequent reception of that burst at an aircraft or ground receiver. Operationally, voice communications in a sector is provided in essentially the same manner as voice is conventionally provided. Preferably, a single channel frequency per sector will be allocated to party line voice communications. This channel will be time-shared by the ground and the aircraft in the sector via push to talk procedures in which a participant in normally in a listen-mode. When required, the participant will seize the idle channel by pushing a button and beginning to talk.

Unlike the current system, according to the invention the system is a digital. The analog voice waveform is digitally sampled, quantized and compressed via a common voice coding algorithm. With the proposed RS (63,39) code and a 14.4 Kbps signaling rate, a digital voice data rate of more that 9.6 Kbps (14.8 transmission rate) is supported. Modern compression algorithms can support near toll quality at this bit rate. Each transmission of voice communications will be supported by a burst comprised of a preamble following by a payload of digital compressed and coded voice. The synchronization preamble for voice transmission bursts may be identical to the preamble for data channel burst, described below. The payload structure for digital voice will be tailored to the specific voice compression algorithm chosen.

Each communications burst of both the voice and data subnetwork are time multiplexed. Time epochs are broadcast by the subnetwork controllers on the ground-to-air links. These time epochs establish the frame's boundaries and provide an infrastructure for allocation of allowable burst time assignments. The burst allocation structure is based on assignable units of time (referred to as time slots) that are 17.5 msec long (equivalent to 252 bits, or 126 QPSK symbols, at the selected transmission rate of 14,400 bps). The time slots are then organized into a well defined burst structure. In a preferred embodiment, each burst by an aircraft or ground transmitter is composed of the following components as illustrated in FIG. 1.

1. A guard band 11 of 5 msec duration: this time guard (equivalent to 72 bits of transmission time) is driven by the RIF signal travel time across the geographical extent of the sector; such a guard band is required to ensure that no mutual interference between a transmitter near the end of its burst and a second terminal at the beginning of its burst.
2. A synchronization preamble 12 of 3.75 msec duration (54 bits or 27 DQPSK symbols): the synchronization preamble allows time for the transmitting terminal to sufficiently ramp up in power, for the receiving terminal to achieve bit sync, and to mark the beginning of the burst with unique pattern of bits called the unique word. Guard band 11 and synchronization preamble 12 constitute the burst header 10H.
3. An information payload 13 is the part of the burst that contains the user information (system management data 14 in a SACOM control burst). This part of the burst always includes at least 8.75 msecs of transmission time (126 bits) which accounts for 2 rate (63,39) code words. Additional information payload slots 15 (each of the same 17.5 msec duration) can be added to a burst (up to 1024 octets of encoded user data). The information payload includes encoding with a Reed-Solomon (RS) block code which supports the correction of channel errors; the chosen RS code is a (63,39) code which means that to each 39 bits of data, 24 redundant bits are added making a total of 63 bits; such a code is capable of correcting an error burst of up to 12 consecutive errors. A typical user information payload of 472.5 msec (supporting a user information block of 512 octets (4,096 bits) of information) would require a total of 27 slots. An information payload of 512 octets (4,096 bits) encodes into 106 codewords of 39 bits each and results in 6,678 transmission bits . These bits require 27 of the 252 bit SACOM transmission slots when the burst guard band and synchronization preamble (total of 126 bits) are accounted for. The transmission of this information payload thus requires 27 slots (or equivalently 472.5 msecs of transmission time).

All aircraft use the above burst structure to regularly send surveillance data to the ground in well-defined time allocations reserved for surveillance. The surveillance data messages will be coded into a strict format that nominally occupies 1 control slot and 1 additional slot for the remainder of the surveillance information payload, for a total burst of 35 msec including the sync preamble and guard time.

Aircraft will use a similar burst structure to send ATN-compatible protocol data units (PDUs) to a ground destination as required. According to one embodiment, such data bursts will be "scheduled" via a reservation based protocol. The bursts from the ground radio in a sector will relay requested data to aircraft; the ground radio will also broadcast control data that coordinates and manages access to the data channel by all aircraft in a sector. These data bursts will be comprised of 1 control slot which holds 2 code words of a CLNP payload and 1 or more additional user payload slots, each of which supports on additonal 4 rode words. PDU length is variable up to a length of 1024 octets of user information and will always be encoded and supported by an integral number of SACOM frames. All user data transmissions will be encoded. A CLNP PDV of 64 octets (512 bits) requires a burst length of 4 slots (70 msecs), while a CLNP PDU of 512 octets (4,096 bits) requires a burst length of 27 slots (472.5 msecs). The largest ATN compatible CLNP PDU of 1024 octets (8,192 bits) will require 53 slots (a burst time of 927.5 msecs).

A/G DATA LINK LAYER

Figure 2:
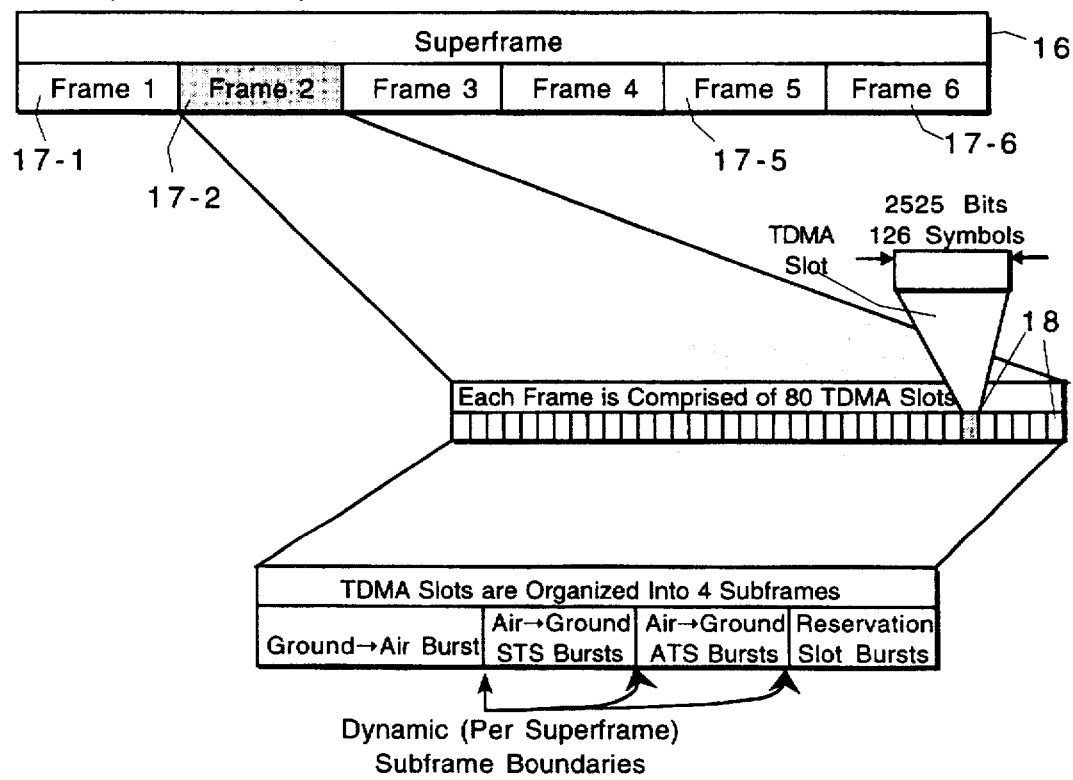
FIG. 2 illustrates the organization of a typical super-frame.

SACOM utilizes a Time Division Multiple Access (TDMA) scheme (as described later herein) to share the underlying A/G physical data communication link between various uplink and downlink digital data communication participants. As illustrated in FIG. 2, the primary data link layer demarcation element is the SACOM superframe 16. A superframe consists of 8.4 seconds of transmission resources at the basic transmission rate of 14,400 bps.

Burst and Broadcast Frame Structure

A SACOM superframe is composed of six (6) frames 17-1, 17-2 . . . 17-6, each with a one (1.4) second duration. Frames are composed of 80 time slots 18 (each time slot has a duration of 17.5 msecs and provides for 252 transmission bits) that can be allocated to specific transmission bursts by the aircraft or the ground. The SACOM time slot is the smallest unit of allocable transmission resource. The smallest allowable SACOM burst has a duration of 1 slot (17.5 msecs). It includes an information payload consisting of a 9 bit information marker and 126 transmission bits (composed of 2 codewords of 78 user information bits and 48 encoding bits). Each burst also includes the nominal guard time of 5 msec (72 bits) and 3.75 msecs (54 bits) of synchronization preamble.

Up to 80 separate bursts (each with a single slot duration) can be fit into one second frame of a 1.4 second duration. Requests on the channel reservation subframe and transmission acknowledgements will typically be composed of a single time slot. Surveillance bursts will always have a fixed number of slots (nominally 2), data bursts will typically be composed of one control slot described above (which includes 78 user bits) and a variable number of additional slots for the remaining user information payload.

Subframe Organization

All data communications from air-to-ground and from ground-to-air take place within the TDMA frame structure. The frame is thus composed of a series of bursts by the ground and aircraft transmitters. Each burst is an integral number of time slots. Individual bursts are organized into subframes according to the direction of the transmission and the types of services being supported. There are four (4) subframes within each frame as follows:

1. Ground-to-air burst, conveying the TDMA timing and data link control messages in addition to relaying uplink data. (FIG. 4A)
2. Air-to-ground surveillance, referred to as synchronous transmission service (STS) bursts, convey the aircraft navigation state as well as the need to transmit or receive data. (FIG. 4B)
3. Air-to-ground data, referred to as asynchronous transmission services (ATS) bursts, convey onboard data (such as data link application services) to the ground. (FIG. 4C)
4. Air-to-ground reservation bursts, which provides another mode for requesting to receive or to transmit data. (FIG. 4D)

The subframe boundaries within each frame are dynamic and are adjusted by the SACOM Data Controller (SDC) scheduler in order to adapt the frame structure to current transmission needs. These boundaries are broadcast in the ground-to-air burst that comprises a subframe. Location of the subframe boundaries may be different for each of the six frames in a superframe. However, subframe boundaries can only be modified on a per superframe basis. Time is referenced to a timing epoch broadcast from the SACOM control centers located within the area control facilities (ACFs). Time is synchronized across sub-networks by the SDC. Contention for transmission burst time is arbitrated through a reservation scheme managed by the system scheduler resident in the SDC. The arbitration mechanism is different for the two modes of operation supported (synchronous and asynchronous services).

Figure 4A:
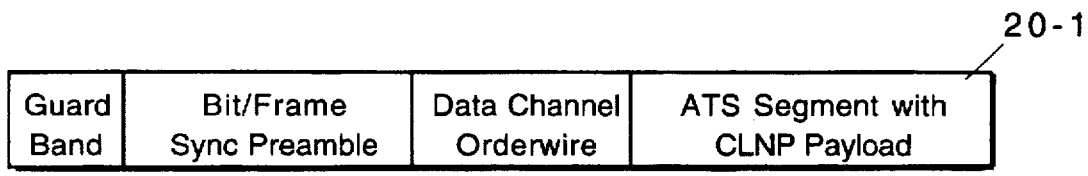
FIGS. 4A, 4B, 4C and 4D illustrate the format of ground-to-air subframe 1, the format of air-to-ground burst in subframe 2, the format of air-to-ground burst in subframe 3, and the format of air-to-ground burst in subframe 4, respectively.

Subframe 20-1, shown in FIG. 4A is composed of a single ground-to-air burst that conveys both the SACOM TDMA timing and the reservation notices. Subframe 1 also contains ground-to-air ATN PDUs (asynchronous traffic) containing data addressed to specific aircraft. This traffic includes all ATN ground-to-air payloads.

Figure 4B:
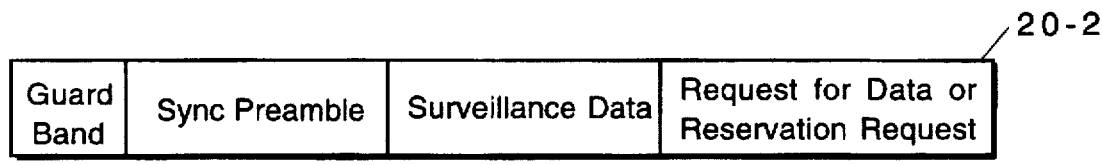

Subframe 20-2, shown in FIG. 4B includes all synchronous air-to-ground bursts as defined later herein. This subframe supports dedicated air-to-ground transmission time for all the aircraft participating in a particular sector. Subframe 2 is composed of multiple bursts, where each burst is uniquely assigned to an aircraft in the sector. The synchronouos mode of operation supports surveillance reports once per superframe from each aircraft in an enroute sectors; this reporting structure provides an 8.4 second refresh rate for the surveillance messages in the enroute sectors. Each aircraft in a terminal area is provided two position reports each superframe for a refresh rate of every 4.2 seconds. Each synchronous service primitive includes a guard band, a preamble, and 1½ slots and 2 slots for the information payload consisting of the surveillance report. Each surveillance burst thus requires a total time of 37 msec, including the guard band, burst synchronization preambles and encoding. As described later, each assigned synchronous air-to-ground burst also provides the sender with an opportunity to augment his downlink with additional ATN payload via the asynchronous mode of operation. That is, each air-to-ground synchronous burst provides the sender an opportunity to request access to the statistically multiplexed portion of the TDM frame.

Figure 4C:
Figure 4D:
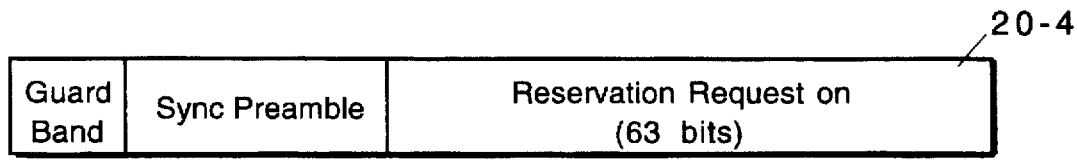

Subframe 20-3, shown in FIG. 4C contains the air-to-ground asynchronous data bursts described later. Burst time in this subframe is reserved via requests contained in the synchronous bursts in subframe 20-2 as well as the reservation slots of subframe 20-4. The SACOM Data Controller (SDC) receives these requests, mediates conflicts, and broadcasts the subframe 20-4 burst schedule within subframe 1. On board the aircraft, the SACOM Data Processor (SDP) performs the functions of formulating requests to receive and send data, and also performs the assembly/ disassembly translation required between the channel bursts (transmitted & received) and the data frames of the ATN.

Finally, subframe 20-4, as shown in FIG. 4D is a logical reservation channel. This subframe provides an additional opportunity to request to send air-to-ground data. While this opportunity is reliably provided every 8.4 seconds via the dedicated synchronous mode of operation used for surveillance, subframe 20-4 augments this every periodic 8.4 second access time and provides another reservation opportunity in every frame (once each 1.4 seconds). Access to the reservation channel is via a random access scheme (slotted Aloha) so that, under heavy load, collisions due to simultaneous transmission bursts may sometimes occur.

Figure 3:
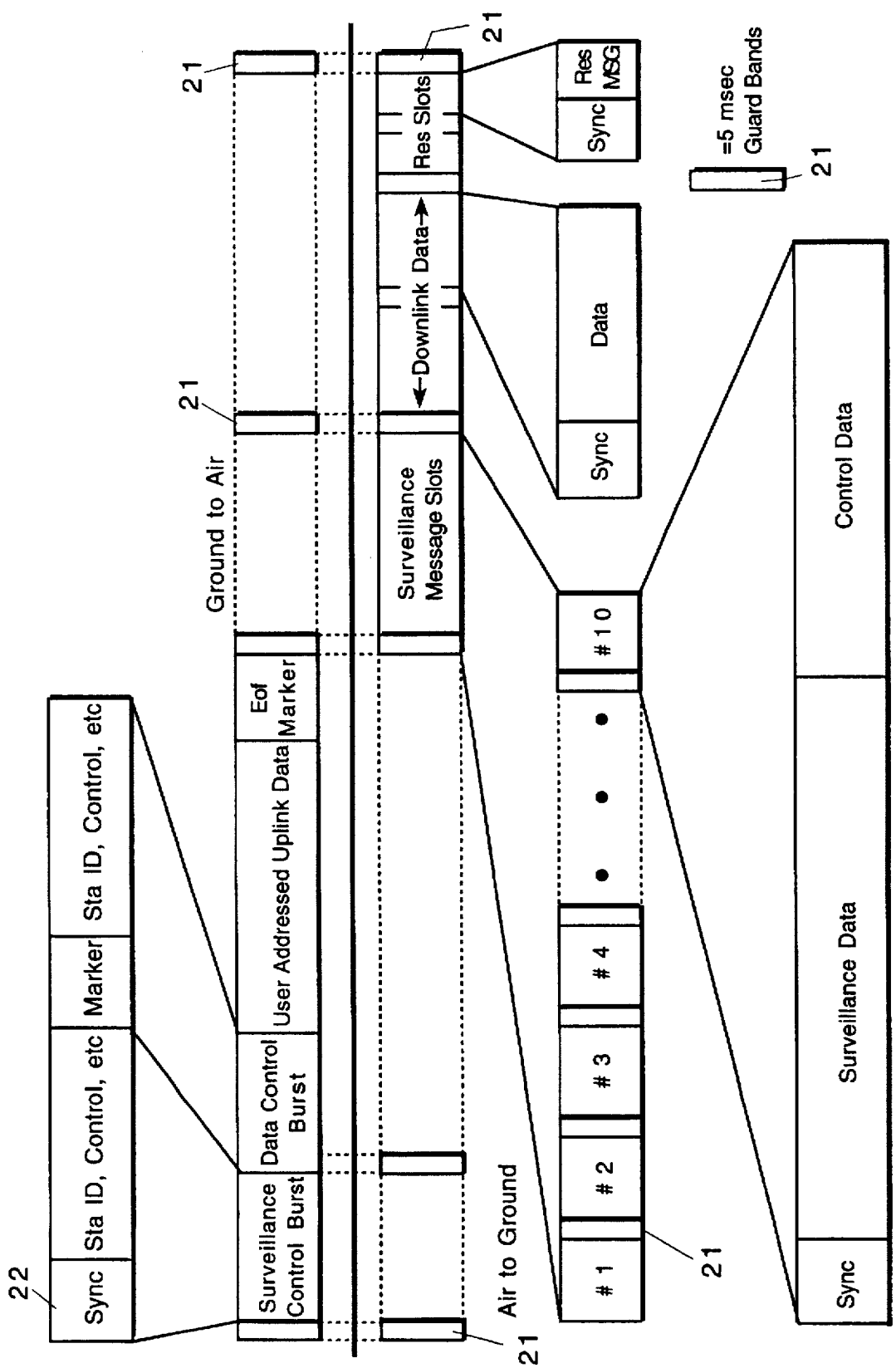
FIG. 3 illustrates an embodiment of a frame according to the invention.

FIG. 3 illustrates a typical series of transmission bursts according to the invention. The individual bursts are separated by 5 msec guard bands to ensure that there is no overlap. Each burst begins with a sync preamble 12 that supports bit synchronization and burst synchronization word. The bit sync pattern may be a string of alternating 1s and 0s and the burst sync word is a sequence of bits (such as a Williard code) with good cross-correlation properties. In subframe 20-1, the burst sync word is particularly important since it arrives at the 1.4 second epoch and provides the time reference for the SACOM TDMA timing and allows all aircraft to synchronize to the SACOM system clock. FIG. 4A illustrates a sample subframe 20-1 structure that includes the burst sync word, frame sequence number and control parameters that describe the current schedule/permission of TDMA burst assignments. In addition, FIG. 4A also illustrates the subframe location of the uplink asynchronous data (ATN payload) that is contained within subframe 1. FIG. 4B through 4C similarly illustrate the structure of the burst(s) in subframes 20-2, 20-3 and 20-4, respectively. Note that in all cases bursts include the identity of the transmitter, indicate burst type, and incorporate a forward error correction field. The table shown in FIG. 5 supplements the outline of these subframe structures with a detailed breakout of a typical surveillance burst.

Broadcast Media Access Protocol

The media access protocol is supported by the frame structure described above. Subframe 20-1 supports the system control orderwire and conveys timing epochs, definition of the frame structure (subframe boundary locations), and air-to-ground burst allocations for all aircraft in the sector. The orderwire of the first frame in each superframe includes information on system status and provides control information on the location of the dynamic frame boundary for the other frames in the superframe. The dynamic frame boundary defines the amount of transmission resources allocated to the four subframes in each frame of the superframe. The orderwire of the subsequent frames of the superframe provide additional frame timing epochs and the service allocations for that frame. The dedicated surveillance bursts assigned to an aircraft enables an aircraft to request additional asynchronous services (ATN protocol architecture support on the air-to-ground link) every 8.4 seconds. The asynchronous reservation channel in subframe 20-4 provides an additional opportunity to request air-to-ground transmission time once every frame (1.4 seconds) under a slotted Aloha arbitration mechanism.

There are different access protocols for synchronous (dedicated) vs. asynchronous (statistically multiplexecd TDM) modes of operation. Initial access to the synchronous subframe is coordinated through the SACOM Data Controller (SDC) of this invention. That is, an entering aircraft is assigned a synchronous mode allocation as part of the switchover process from one sector to another. Initial access is accomplished as part of operational procedures at time of departure in a similar fashion to context management procedures for entry into the ATN network.

Alternatively, a new aircraft (aircraft entering a new sector's subnetwork without a prior synchronous connection) may enter a subnetwork via the slotted Aloha arbitration mechanism described below for the asynchronous traffic. The synchronous assignment would be scheduled by the SDC and disseminated via the system orderwire within the air-to-ground burst in the next frame in a similar fashion to the asynchronous mode of operation. Once an aircraft has occupied a given synchronous assignment, the aircraft has the dedicated use of that assignment (occurring periodically every 8.4 seconds) for the entire time that the aircraft is in the sector.

Asynchronous services are obtained by an aircraft via a reservation scheme. For air-to-ground transmit services, the aircraft broadcasts a request to send data message. Upon receipt of this request, the SDC interprets and schedules a transmit slot time for the requesting aircraft and sends this schedule up with the control information in subframe 20-1 of a following frame. The aircraft then broadcasts the data into the assigned asynchronous assignment. This asynchronous burst may also have appended to it a message to the SDC which indicates whether or not there is a continuing need for the asynchronous service. This assignment procedures allows the aircraft to chain multiple air-to-ground service units and continuously request additional traffic access without requiring new reservation bursts. The SDC receives appended messages and makes up the new schedule of synchronous slots accordingly.

Asynchronous, air-to-ground, request messages are initiated at the aircraft. They are sent via the synchronous burst (subframe 20-1) or in a specifically reserved reservation channel (subframe 20-4). All responding ground-to-air traffic destined for aircraft are combined by SACOM into a serial data string that is incorporated into the ground-to-air sub-burst of subframe 20-1; this sub-burst supports the transmission of information to specific aircraft or to all aircraft in a sector. All specific and broadcast ground-to-air messages are grouped into the same ground-to-air burst. Each aircraft hears and reads the entire ground-to-air subframe. The subframe is thus composed of one burst header and multiple user data fields. Each user data field has associated control parameters, including the service connection association number. Addresses within the connection association identify the destination aircraft.

Logical Link Control Protocol

The logical link control protocol provides the interface to the subnetwork independent convergence protocol (SNICP) layer above. This defines the logical links of the invention within the shared broadcast medium. The logical link is also responsible for identifying and separately routing the synchronous and asynchronous bursts as well as channel reservation bursts.

Logical links are set upon via a "login" type process that assigns a new user a unique ID for the session. Upon entry into a sector, every aircraft is assigned a connection ID which uniquely addresses that aircraft for the duration of the session. The connection ID will be a single byte. Other unique session IDs will be used to address all aircraft in a sector, or a subset of aircraft in a sector. The assignment of the connection ID will be contained in the ground-to-air subframe 20-1 burst.

The interface to the next higher level will be a serial stream of CLNP protocol data units (PDUs). The SACOM logical link layer marks the data PDVs with appropriate flags and inserts them into the SACOM physical layer. At the ground radio transmitter, a serial stream of CLNP data units arrive and there are incorporated by the SDC into the subframe 20-1 burst. At the ground radio receiver, a series of separate bursts is received at the ground and the SDC strips the framing and other overhead of these bursts and outputs a single serial stream of CLNP PDVs. At the aircraft the SDP performs the comparable logical link functions as the SDC on the ground.

CONGESTED OPERATIONAL SCENARIOS

Use of an additional frequency that is dynamically assigned to a sector is provided on an as-needed basis. The additional frequency will be used to support another data channel that will provide supplemental asynchronous services. With only a single dedicated data frequency during normal operation, that single frequency is shared by both air-to-ground and ground-to-air traffic. During a period of congestion support of such bi-directional traffic on a single frequency may not be possible. In such case, a second data frequency could be dynamically allocated to a sector.

This scenario would provide more than double the communications bandwidth with little extra additional equipment in the aircraft or the ground. In order to support this scenario, the aircraft would only need the capability to transmit on the dedicated frequency while it was receiving on the dynamically allocated frequency; it would still only require a single transmitter and a single receiver; however, if the aircraft is required to listen in on the second channel during the orderwire broadcast of subframe 1 on the dedicated data channel, then the aircraft would require a dual data channel radio receiver. The dual channel receiver would also be required if the aircraft had to listen to the synchronous broadcasts of other aircraft (as part of a collision avoidance system) while it was receiving ATS data on the second data channel. In order to support the congestion scenario, the ground receiver need only be composed of a single transmit channel and a single receive channel capable of simultaneous operation (with the receive on the dedicated data frequency, and the transmit on the second frequency). However, if, in the interest of efficiency, the ground transmitter was required to transmit ATS data on the second frequency during subframe 1, then the ground transmitter would require a dual transmitter. For simplicity in the discussion in the following subsections, we have assumed only single a channel receiver and a single channel transmitter for the aircraft and ground, respectively.

EXAMPLE FREQUENCY ALLOCATION

The current civilian A/G radio for party line voice currently occupies the VHF frequencies roughly between 118 MHz and 138 MHz. The spacing of the carriers that support the separate voice channels are 25 KHz apart. In addition, there is VOR spectrum from roughly 108 MHz to 118 MHz that could become available if GPS position location were fully-implemented for all aircraft. Finally, there is military UHF spectrum used for party line voice which could also be used within a combined surveillance and data system. Key to the implementation of this invention is the assumption that compressed digitized voice could allow a 10.0 KHz spacing of voice channels. Indeed, low-cost technology is available to support a 10.0 KHz spacing with either digital or analog voice channels. With such reduction of channel spacing, a number of channels become available to support A/G data.

Frequency separation between voice and data channels will be needed since transmitter and receivers will be co-located and may share the same antenna. The discussions below explains how the current allocation at VHF for A/G radio could be used in the transition period and at the end state of full SACOM implementation.

AIRBORNE EQUIPMENT DESCRIPTION

Figure 6:
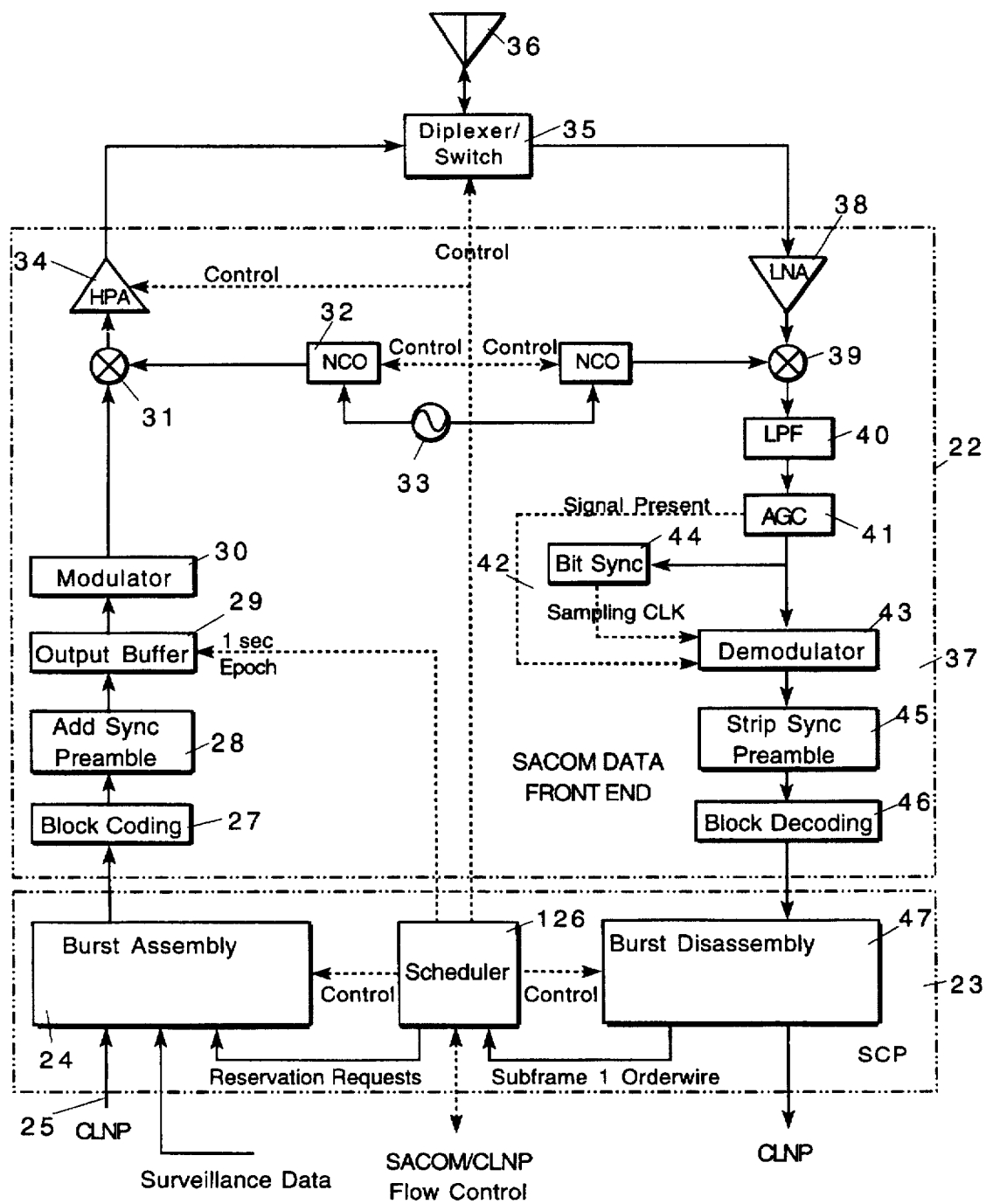
FIG. 6 is a block diagram of an embodiment of an aircraft data transceiver according to the invention.

The onboard equipment required to support the SACOM data channel is illustrated in FIG. 6. Note that the Data Front End 22 essentially supports the interface with the channel or physical layer, while the SDP 23 controls the access to the channel and the interface with CLNP.

In the transmit direction, the SDP 23 contains the burst assembler 24 which creates the bit stream that feeds the associated air-to-ground transmit front end its transmission burst. The bit stream is composed of CLNP PDVs 25 received from that interface, plus synchronous data received from the navigation controller. The transmit front end receives the bit stream from the burst assembler and performs the forward error encoding 27 and adds the synchronization sequences 28. The full bit stream is passed to the radio at the proper time as coordinated by the SDP scheduler 26. The data is then buffered 29 and outputted from buffer 29 to modulator 30 at the 1.4 sec epochs set by scheduler 26, and converted to the RF transmission frequency by converter 31 in conjunction with number-controlled oscillator 32 and RF source 33. The output of converter 31 is amplified in 34 and supplied to diplexer/switch 35 and antenna 36. Control over diplexer/switch 35, amplifier 34 and NCO 32 is by scheduler 36, as described earlier.

In the receive direction, the receive front end 37 demodulates the incoming bursts into a serial data stream. The receive front-end 37 incorporates a low noise amplifier 38, down-converter 39, low pas filter 40, AGC circuit 41, which may provide a signal present indication 42 to demodulator 43. The output from AGC circuit 41 supplies demodulator 43 and its sync circuit 44, which derives a sampling clock for demodulator 43. Digital signals from demodulator 43 pass through sync preamble stripper 45 and block decoder 46 to burst disassembler 47. The burst disassembler 47 decodes the information burst and routes order-wire information to the scheduler and ATS data to the CLNP interface.

Figure 7:
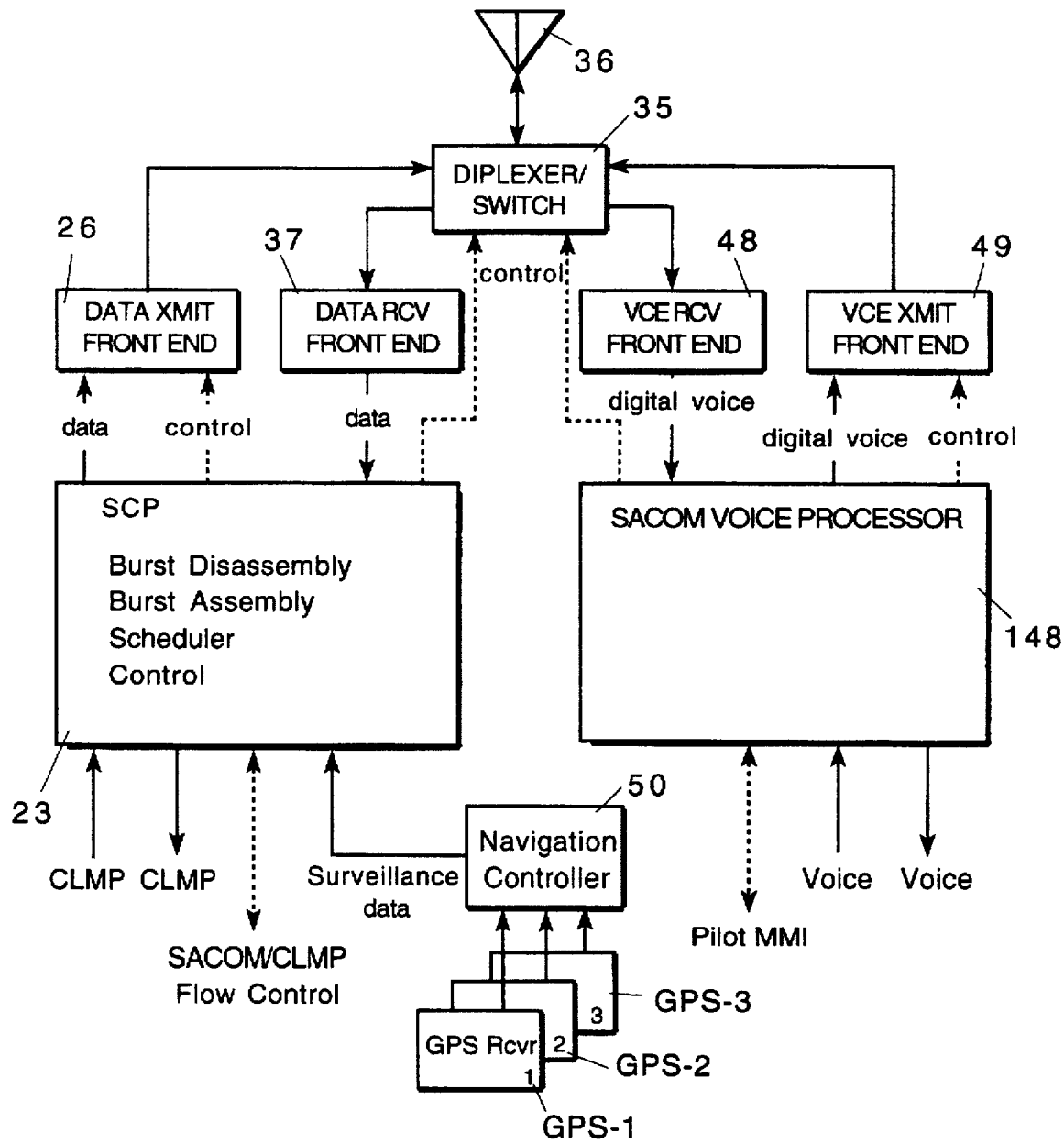
FIG. 7 is a general bock diagram of the complete suite of aircraft equipment in one embodiment of the invention.

FIG. 7 illustrates the complete suite of aircraft equipment that includes the data channel processor and transceiver (23, 26, 37), the voice processor 48 and transceiver 49, and the surveillance equipment 50 with the triply-redundant GPS receivers GPS 1, GPS 2, GPS 3, and the navigation controller. Voice processor utilizes conventional digital receive 48 and transmit 49 front-ends. Note shown is a spare VHF/UHF transceiver which may be provided.

GROUND TERMINAL DESCRIPTION

Figure 8:
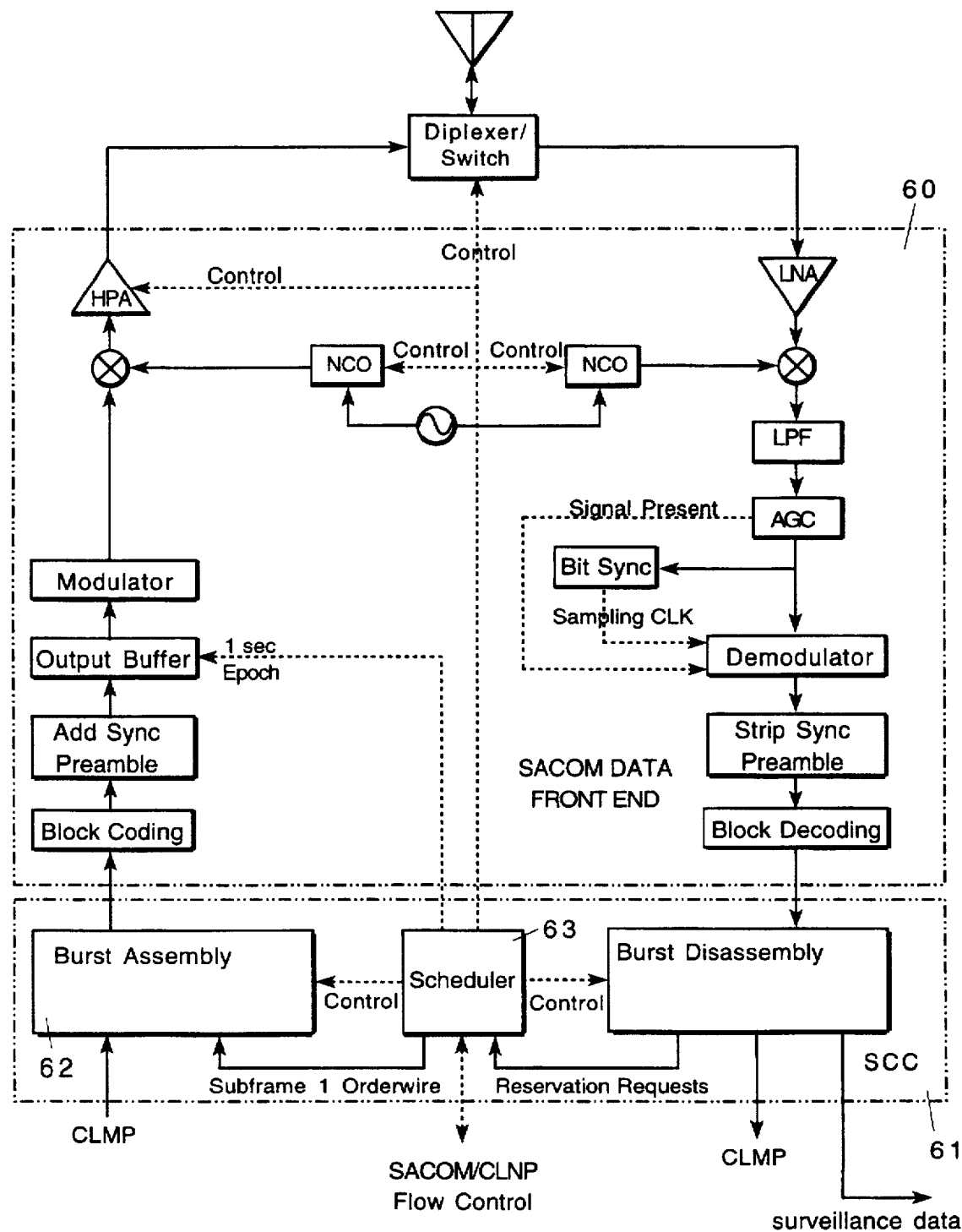
FIG. 8 is a block diagram of one embodiment of a ground data transceiver.

The ground equipment required to support the SACOM data channel is illustrated in FIG. 8 and parallels FIG. 6. Note that, as with the aircraft terminal, the SACOM Data Front End 60 supports the interface with the channel or physical layer, while the SCC 61 controls the access to the channel and the interface with CLNP.

In the transmit direction, the SCC 61 contains the burst assembler 62 which creates the bit stream that feeds the associated ground-to-air transmit front end its transmission burst of subframe 20-1. This bit stream is composed of the CLNP PDVs received from that interface, and the subframe orderwire information which is provided by the SDC scheduler. The transmit front end receives the bit stream from the burst assembler 62 and performs the forward error encoding and adds the synchronization sequences. The full bit stream is passed to the radio at the proper time as coordinated by the SDP scheduler 63. In the receive direction, the receive front end demodulates the incoming bursts into a serial data stream and the burst disassembler decodes the information burst and routes reservation request information to the scheduler 63, asynchronous data to the CLNP interface, and synchronous data to a central destination.

SUPPORTING INFRASTRUCTURE

The Surveillance and Communications (SACOM) system provides both voice and data communications across air/ground links. Available data and voice SACOM services provide a robust infra-structure for the integration of navigation, surveillance and communication requirements defined earlier. SACOM voice and data links are supported by separate air/ground radios, but their operation is coordinated within sectors via the SACOM Data Controller (SDC) located within the Area Control Facility (ACF). Once SACOM network entry is achieved, switchover between sectors in the same ACF region is coordinated by the responsible SDC. Switchover between sectors reporting to different ACF's (that is, sectors controlled by different SDCS) is coordinated through a SACOM network management structure between SDCS.

The following sections describe a system architecture concepts and typical operational scenarios for the communication system, switchover procedures from subnetwork to another for both the voice and data sub-networks, the interactions between various system elements, and the services available via system links and typical service provisioning procedures.

SYSTEM OPERATION

For both the voice and data subsystems, SACOM includes equipment that implements the physical and data link layer protocol operations defined as a real communication subnetwork (as defined within ISO). Each real subnetwork (voice and data) for each sector is referred to as a SACOM subnetwork. A real subnetwork is defined within ISO as a collection of equipment and physical media that forms an autonomous whole and which can be used to interconnect real systems for the purposes of communications. There is, therefore, both a SACOM voice subnetwork and SACOM data subnetwork for each sector. For the data subnetwork, SACOM also includes Subnetwork Access Protocol (SNAcP) network sublayer functions for access to the transmission capabilities of the SACOM data subnetwork.

System Architectural Concept

The communication subsystem of the invention provides for both voice and data communications. Digital radios are used to support each of these communication sub-networks. The voice communications is accessed via a voice control unit on board the aircraft and at the ground locations. The voice is digitally encoded and can therefore use a common radio with the data communications. The voice communications is essentially identical to today's radios except that it is end-to-end digital, it is automatically monitored, and failures are automatically detected and recovered.

The data communications subnetwork supports both a CONS mode services (dedicated synchronous transmission services denoted (STS)) and CNLS mode services (statistically shared asynchronous transmission services denoted (ATS)) data transmission services. These data communication services are accessed via the SACOM Data Processors (SDP) located on board the aircraft and the SACOM Data Controller (SDC) located at the ACF.

The SDP provides the data transmission service interface to the connectionless network protocol (CLNP) machine that supports airborne applications, (such as, the two-way data link—TWDL and the Context Management Communications (CM-Comm) application). It also provides a CONS service interface for dedicated services. An SDP is required within each aircraft that participates in the SACOM system. The SDP acts as the real system internetworking unit between the SACOM subsystem and the A/G router on board the aircraft. It performs frame assembly and disassembly functions and buffers the data transmission flows between the subnetwork independent convergence protocol (SNICP) supporting the ATN router and the SACOM radio.

Figure 9:
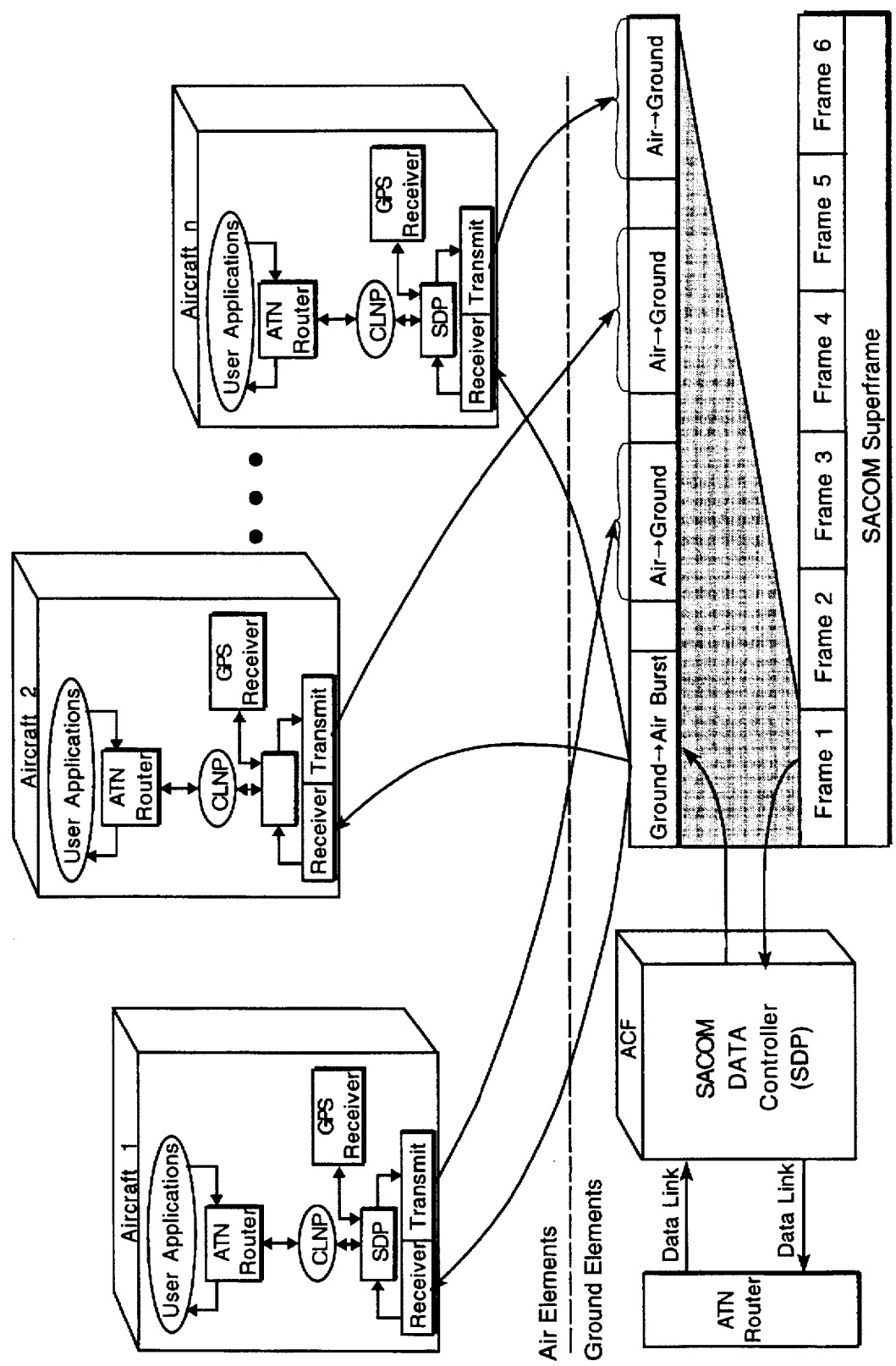
FIG. 9 is a diagrammatic illustration of the data sub-network bursts according to one preferred embodiment of the invention.

The SDC provides the data transmission service interfaces to the CLNP protocol machine that supports ground applications. An SDC is required at each ground master station, located within the ACFs. SDC functions include the same link processing (and frame processing) functions as the SDP. It also supports additional system management and control responsibilities. Included in the system management and control responsibilities are SACOM service scheduling and frame timing dissemination. FIG. 9 illustrates the locations of the SDCs and SDP within context of the air/ground communication components and also illustrates a typical allocation of air-to-ground burst times among the aircraft #1, aircraft #2 . . . aircraft #N. Of particular significance is location of the SDC/SDP between the SACOM radios and the ATN routers. This arrangement allows the SACOM subnetwork to support typical ATN communication operations and data link system applications.

The SACOM communications subsystem is nominally operated as a collection of centralized A/G data transmission subnetworks, each managed by an SDC. The SDCs are located at the ACFs and support all necessary management and control of the SACOM subsystem within a particular ACF region. The SDCs at a particular ACF are networked together. The SDC network exercises the ATN G/G subnetwork to establish a management orderwire between SDC locations. Each controller sector being maintained at a particular ACF is allocated a SACOM data communication frequency, which independently supports the types of services defined later herein. In some congested sectors a second frequency may be brought online during busy hour operations. In general, however, each subnetwork consists of one SACOM radio (with appropriate sparing) reporting to an SDC located within its associated ACF.

Figure 10:
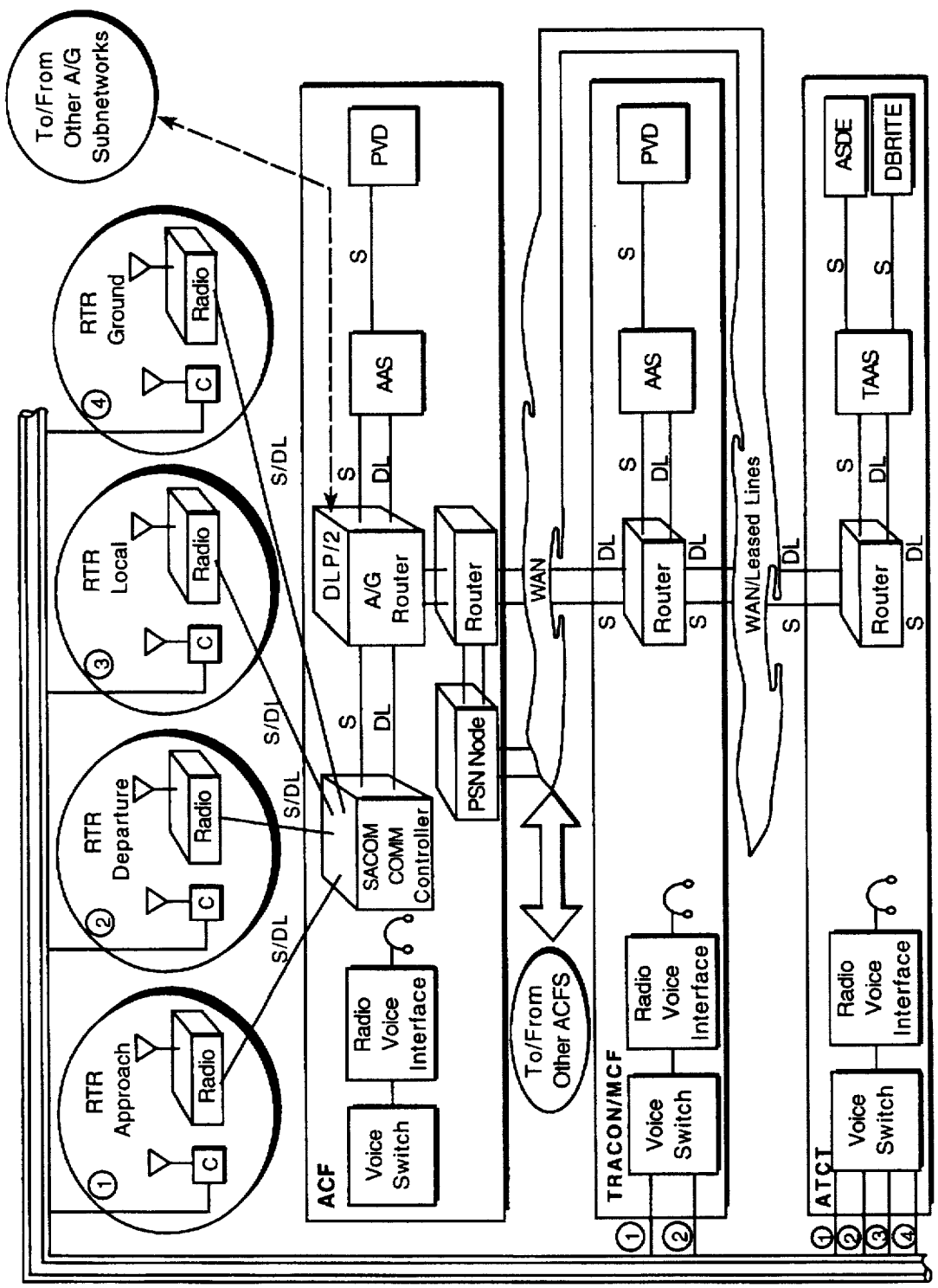
FIG. 10 illustrates typical sub-network equipment configuration of preferred embodiments of the invention.

The SDC operates and controls all operations within its subnetwork (sector) at the local ACF. It also supports handoff procedures between sectors (SACOM frequencies) within an ACF and between sectors at different ACFs. Operations of SACOM sector equipments (including remote ground SACOM radios, aviation-based SACOM radios participating in the sector broadcasts, their associated SDP and the SDC) are referred to as a SACOM subnetwork. FIG. 10 illustrates a typical SACOM subnetwork equipment configuration at ACFs, TRACONs and MCFs. The following paragraphs provide additional detail on these elements and the supporting infrastructure.

NAS Functional Architecture

The SACOM functional architecture provides voice communications, surveillance and data link services in an integrated architecture by sharing equipment both physically and logically. For example, the bandwidth on the physical lines between a control site and a remote site may be partitioned between voice communications, surveillance and data link traffic. Or, a set of radios can dynamically be allocated to voice communications, surveillance and data link, with a provision for pooled spares. These radios are functionally identical, but operationally, can used for either voice communications, combined surveillance and data link, or pooled spare.

While the design actually incorporates shared equipment, it is easier to explain the architecture by partitioning the equipment functionally. The architecture for the three functions, voice communications, surveillance and data link are discussed below.

Voice Communications

The basic function of the voice communications subsystem is to provide A/G and A/A party line voice communications between a single controller and all the aircraft in that controller's sector.

Figure 11:
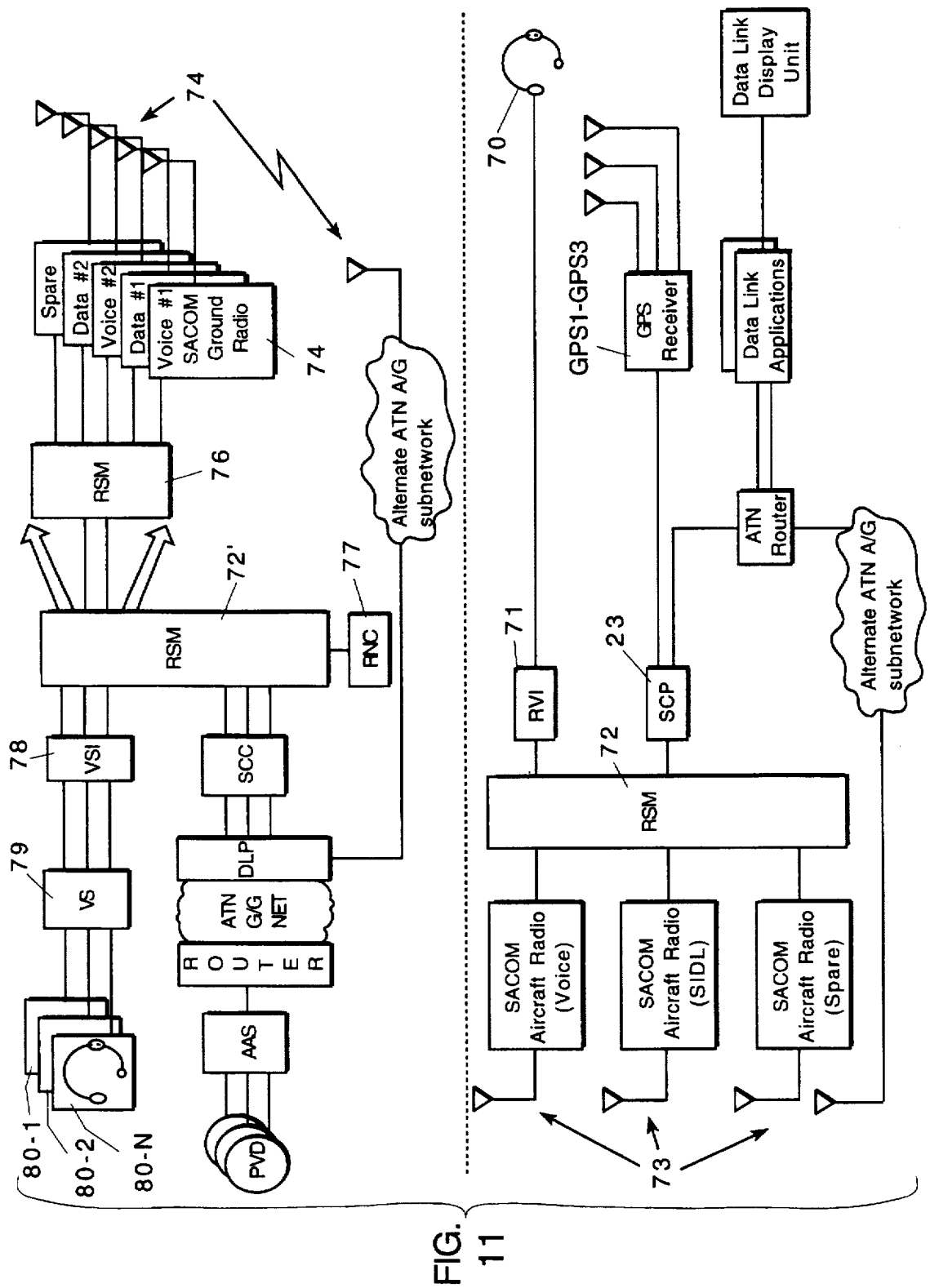
FIG. 11 is a further functional block diagram of the system architecture.

The equipment string supporting the voice communications subsystem is shown in FIG. 11. It includes the following elements:

1. Pilot Headset/Microphone 70.
2. Radio Voice Interface (RVI) 71.
3. Radio Selection Switch (RSS) 72.
4. SACOM Aircraft Radio/Antenna 73.
5. SACOM Ground Radio 75/Antenna 74.
6. Radio Switching Multiplexor (RSM) 76.
7. Radio Network Controller (RNC) 77.
8. Voice Switch Interface (VSI) 78.
9. Voice Switch (1) 79.
10. Controller Headset/Microphone (1).80-180-1, 80-2, 80-n.

Equipment Notes

1. Existing equipment not part of SACOM.

Pilot Headset/Microphone

The pilot headset/microphone 70 provides the following functions:

1. Radio control functions (PTT, frequency setting, etc.).
2. Audio Interface.

Radio Voice Interface (RVI) 71

The Radio Voice Interface (RVI) 71 provides the following functions:

1. Headset/microphone/speaker interface.
2. A/D conversion of voice signal.

Radio Selection Switch (RSS) 72

The Radio Selection Switch (RSS) 72 provides the following functions:

1. Connects the RVI to the active SACOM Aircraft Radio/ Antenna.

SACOM Aircraft Radio/Antenna 73

The aircraft digital radio is an airborne version of the SACOM digital radio, and is fully compatible with it. It has the following additional functions:

1. How does it logon the frequency initially?
2. How does it transition from one sector to another?
3. What are its failover procedures?

SACOM Ground Radio/Antenna 74, 75

The SACOM ground radio was discussed in detail earlier herein. For present purposes, it is simply a VHF/UHF radio (i.e., transceiver) that transmits and receives a 9.6-kbps, digitally-encoded voice signal.

Radio Switching Multiplexer 72

The Radio Switching Multiplexor (RSM) 72 provides the electrical connection, bandwidth management, line monitoring, failure detection and circuit restoral switching capabilities for the physical lines connecting control sites to remote sites. It provides functions similar to those provided by the RCR, except that it is located at both control sites (e.g., ARTCCs) and remote sites (e.g., RCAGs). The RSM 76 provides the following functions:

1. Connection between the Voice switch and the network.
2. Connection between the SCC and the network.
3. Connection between the radio equipment and the network.
4. Multiplexing of the digitized voice and digital data streams between the control site and the remote site for transmission efficiency.
5. Line/circuit monitoring, failure detection and circuit restoral.
6. Automatic testing to sectionalize the failure.
7. Radio and radio link status monitoring to provide service recovery from site, radio and propagation failures.
8. Configure the frequency and function of the radios.

Radio Network Controller (RNC) 77

The Radio Network Controller (RNC) 77 interfaces to the RSM 76 to provide the following functions:
1. Maintenance of the radio network configuration and the potential backup strategies.
2. Control and coordination of the RSMs to provide integrated system monitoring and restoral capabilities.
3. Interface to an integrated network management system for obtaining network status and providing failure alarms.
4. A Graphical User Interface (GUI) Computer-Human Interface (CHI).

Voice Switch Interface (VSI)

The Voice Switch Interface (VSI) 78 provides the interface between the various voice switches 79 and the network. It is essentially an updated equivalent to the COTS RCE. The VSI performs the following functions
1. Conversion of A/G radio control signals (e.g., PTT, M/S switchover, squelch break) to/from the voice switch 79.
2. For analog switch interfaces, converts the voice signal between analog and the vocoded digital format used by the radio.
3. For digital switch interfaces, converts the voice signal between PCM/ADPCM digital and the vocoded digital format used by the radio.

Voice Switch (1) 79

The voice switch is any of the existing FAA A/G voice switches including: VSCS, ICSS, STVS, or ETVS.

Controller Headset/Microphone 80-1 . . . 80-N

The controller headset/microphone 80 provides the following functions:
1. Radio control functions (PTT, frequency setting, etc.).
2. Audio Interface.

Surveillance

The basic function of the surveillance subsystem is to provide periodic (3-dimensional) surveillance position reports from all the aircraft in a controller's sector, so that the aircraft's positions can be displayed on the controllers PVD. Since today's operational concept uses a separate radar system for enroute and terminal airspace, and since today's surveillance position reports are distributed to multiple enroute automation systems, the surveillance position reports need to be distributed to multiple automation systems. A potential equipment string supporting the surveillance subsystem is shown is FIG. 9. It consists of the following elements:
1. GPS Receiver/Antennas 90.
2. SACOM Data Processor (SDP) 91.
3. Radio Selection Switch 92.
4. SACOM Aircraft Radio/Antenna (2).
5. SACOM Ground Radio/Antenna (2).
6. Radio Switching Multiplexor (RSM) (2).
7. Radio Network Controller (RNC) (2).
8. SACOM Data Controller (SDC).
9. Data Link Processor (DLP) (1).
10. ATN G/G Network (1).
11. NAS (G/G) Router (1).
12. Advanced Automation System (AAS) (1).
13. Plain View Display (PVD) (1).

These elements are discussed below.

GPS Receiver/Antennas

The GPS receiver provides the following functions:
1. Determines 3-D position from GPS signal.
2. Formats GPS position information and provides it to ATN aircraft router for transmission to AAS.

SACOM Data Processor (SDP) 23

The SACOM Data Processor (SDP) 23 performs the following functions:
1. Frame assembly/disassembly.
2. A/G subnetwork access request processing.

SACOM Data Controller (SDC)

The SACOM Data Controller (SDC) provides the capability to accept the surveillance and data link information from the radios. The SDC provides the following functions:
1. Accepts SACOM Surveillance/Data link superframe and separates out the dedicated (surveillance) and connectionless (data link) data.
2. Schedules the connectionless data, and manages the frame size.
3. Addresses the surveillance data to provide multicast capability.
4. Control and allocation of the A/G bandwidth.
5. Processing of the data link messages so they can be forwarded (over the ATN) to their proper destination.

Data Link Processor (1)

The Data Link Processor (DLP) provides the following functions:
1. Interface between the ATN G/G subnetwork and one of the ATN A/G subnetworks.
2. Routing between the above subnetworks.

ATN GIG network (1)

The ATN G/G Network provides the following functions:
1. Delivery of multicast surveillance position reports to specified destinations.
2. Delivery of data link messages to/from specified destinations/origins.

NAS GIG Router

The NAS Router provides routing on the G/G ATN subnetwork.

Advanced Automation System (AAS) (1)

The Advanced Automation System provides the following functions:
1. Accepts and processes surveillance position reports and displays them on the controller's PVD.
2. Permits the controllers to send/receive data messages to/from controlled aircraft or aircraft controlled by other controllers.

Plain View Display (PVD) (1)

The Plain View Display (PVD) provides the following functions:
1. CRT display of all aircraft in a controller's sector and those aircraft in adjacent, underlying, and overlaying sectors. The PVD is controlled by the AAS and can be customized by each controller.

Data Link

The basic function of the data link is to provide an A/G subnetwork to permit transmission of ATN-compatible messages between controllers and pilots. The equipment string supporting the data link subsystem is shown is FIG. 9. It includes the following elements:
1. Data Link Message Display/Entry Unit (1).
2. Other Aircraft Data Link Applications (1).
3. ATN Aircraft Router (1).

4. SACOM Control Processor (SCP) (2).
5. Radio Selection Switch (RSS) (2).
6. SACOM Aircraft Radio/Antenna (2).
7. SACOM Ground Radio/Antenna (2).
8. Radio Switching Multiplexor (RSM) (2).
9. Radio Network Controller (RNC) (2).
10. SACOM Data Controller (SDC) (2).
11. Data Link Processor (DLP) (1,2).
12. ATN G/G Network (1,2).
13. NAS (G/G) Router (1,2).
14. Advanced Automation System (AAS) (1,2).
15. Data Link Data Entry Device (1).
16. Other Ground Data Link Applications. (1)

Notes
1. Existing equipment not part of SACOM.
2. Discussed above.

These elements are discussed below.

Data Link Message Display/Entry Unit (1)

This is the device that permits the pilot to send/receive ATN-compatible data link messages to/from controllers and other ground data link applications Other Aircraft Data Link Applications (1)

The ATN concept permits other aircraft applications (e.g., weather display).

ATN Aircraft Router (1)

The ATN aircraft router is a LAN data router on the aircraft that directs the received data to the appropriate user application.

Data Link Data Entry Device (1)

The Data Link Entry Device is the device(s) that permit the controller to send/receive data link messages to/from pilots.

Other Ground Data Link Applications (1)

The ATN architecture permits other data link applications, e.g., weather) to send/receive data link messages.

SACOM Subnetwork Structure and Switchover Procedures

Figure 12:
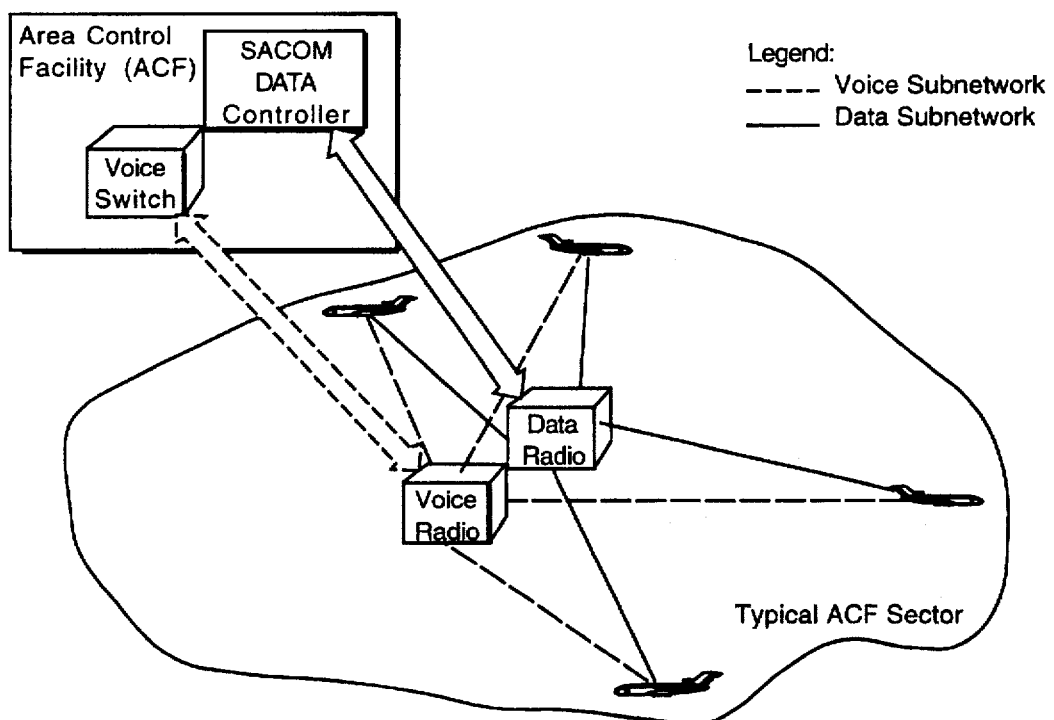
FIG. 12 illustrates a typical sector sub-network according to the invention.
Figure 13:
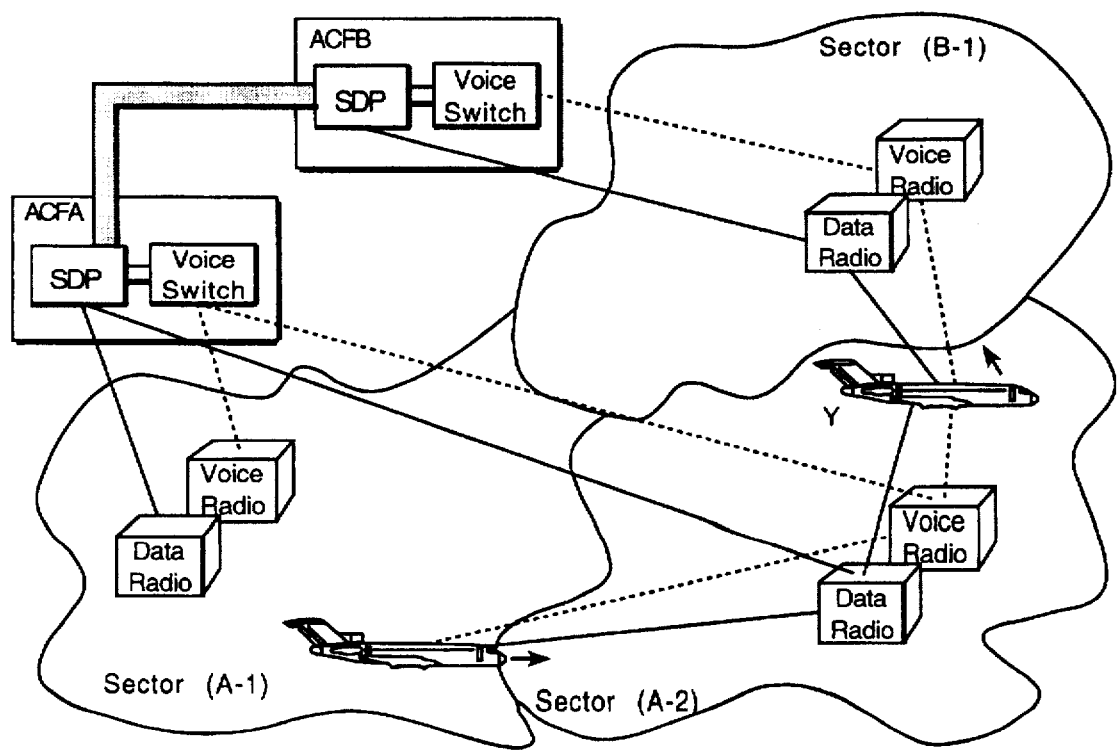
FIG. 13 is an illustration of two typical switch-over scenarios according to the invention.

Each SACOM sector is supported by two identical digital radios dedicated to A/G voice applications and data link subnetwork applications. Both of these applications (voice and data) are operated as a star subnetwork, with the SACOM ground radio acting as the hub for the airborne radios. FIG. 12 illustrates a typical SACOM sector subnetwork. Both the voice and data subnetworks are operated within a star topology, with the SCC controlled ground radios being the hub for each subnetwork. The voice star subnetwork is operated as a party line with a push-to-talk arbitration mechanism. The data subnetwork is managed via a time division multiple access scheme described earlier herein. The frequency assignments for the voice and data radios within a sector are allocated as a pair and operations within a sector is controlled as a paired operation. That is, network entry, status reporting and management of the switchover from one controller sector to another is coordinated between the voice and data subsystems. FIG. 13 illustrates two typical SACOM switchover scenarios. Three sectors are illustrated. Two sectors are within the operational authority of ACF A. The third sector is depicted to be in the region controller by ACF B. In the scenario considered first, aircraft X is participating in the SACOM voice and communications operations of sector (A-1). Its flight path, however, is taking it from sector (A-1) to sector (A-2). Since both sectors are in the same ACF region they are controlled by the same SCC. Switchover of the voice communications is handled in a similar fashion to today's operation. The pilot is instructed to perform a frequency shift between the two sector frequencies via controller authority. The data communications switchover is operationally tied to the voice switchover. It is coordinated via the SCC and the surveillance position reports generated by aircraft X are switched from the sector (A-1) data radio to the sector (A-2) data radio in a seamless fashion. The surveillance subsystem of aircraft X is not effected.

In the second switchover scenario, aircraft Y's flight path is taking it from a sector supported by ACF A to a sector supported by ACF B. The voice switchover in managed in an identical fashion to that described earlier for the first scenario. The data communication subnetwork is again tied to the switchover of the voice subnetwork. A management and control circuit connecting the various SCCs is used to support the entry of aircraft Y in the data communications subnetwork of sector B-1, along with the subsequent teardown of the aircrafts connection within sector (A-2) subnetwork.

The coordinated switchover between various sectors provides SACOM with a seamless infrastructure for both surveillance and communications support. It is one of the underlying simplicities of the SACOM operational concept. To support operations in degraded modes of operations and failure scenarios, SACOM subnetworks also support a late entry procedure. The late entry procedure allows an aircraft to enter a new subnetwork without a prior connection establishment to another sector's subnetwork. This late network entry procedure uses the slotted Aloha channel of the data communication subsystem, described in the following section, to request subnetwork entry.

SACOM SERVICE PROVISIONING

The primary objective of the SACOM communications subsystem is to provide a reliable and integrated infrastructure for the following operational communication requirements:

A/G voice subnetwork that provides communication services between controllers and pilots;

A/G data subnetwork that provides for the following types of services:

Surveillance A/G data transmission and information dissemination services for position reports.

Data transmission services (a data transmission service is defined within ISO as the set of capabilities available from a real subnetwork which may be utilized by users of the real subnetwork for the purpose of sending and receiving data) between Aeronautical Telecommunications Network (ATN) network layer entities on the ground and ATN network layer entities in the aircraft.

A/G Voice Subnetwork

The SACOM voice subnetwork provides A/G voice services via a full-time, circuit-switched, party line between one controller and all aircraft in a single sector. The voice is encoded using a low-bit-rate-voice encoding, and is end-to-end digital. Switchover between adjacent sectors is managed either through voice interactions between the controller and the pilot or through coordination with the A/G data link services supported by the data subnetwork, as described earlier herein.

A/G Data Subnetwork

The SACOM data subnetwork provides a digital transmission service between air-based processing entities and ground-based processing entities via a Time Division Multiple Access (TDMA) scheme. The data transmission service is based on a bit transmission rate of 14,400 bps and is time multiplexed between air-to-ground and ground-to-air transmissions. Both synchronous transmission assignments and asynchronous (statistically multiplexed) modes of operation are supported. The synchronous assignments support the surveillance data transmission services and the asynchronous assignments provide the general data transmission services of the A/G data subnetwork that support the ATN protocol architecture.

For the synchronous assignments each aircraft in a particular sector is always allocated a specific air-to-ground transmission resource (dedicated burst time) upon entry into a SACOM subnetwork of a particular sector. This dedicated resource is what is referred to as a SACOM Synchronous Transmission Service (STS). This STS service mode provides a periodic air-to-ground data transmission capability that can be internetworked to ground/ground subnetworks to support multicasting of surveillance position reports to a list of ground ATC entities. This synchronous mode of operation is tailored to a data link layer transmission system interface to the GPS-based surveillance subsystem.

Synchronous service features include confirmed logon to a specific SACOM subnetwork, seamless switchover between sectors (coordinated from one sector to another in conjunction with the voice communication system), and reserved transmission resources to support periodic position reporting capabilities. The paired switchover of data and voice communications (described earlier herein) supports a continuous surveillance reporting infrastructure across sector transitions. While the characteristics and operating parameters of the synchronous services have been tailored to the support of the GPS-based aircraft position reporting subsystem, they could be accessed by any airborne subsystem requiring a guaranteed periodic reporting service.

Within the asynchronous service assignments (ATN service support), the SACOM data subnetwork functions as a provider of data transmission services to other aviation subsystems. These services referred to as the SACOM Asynchronous Transmission Service (ATS). ATS services support a connection-less mode service (CNLS) at the network access sublayer. They are accessed through an internetworking unit (an internetworking unit is defined within ISO as one or more items of equipments or part of an item of equipment, whose operation provides a network-relay function (that is, a real system which receives data from one correspondent network entity and forwards it to another correspondent network entity)) referred to as the ATN router. ATS data transmission services support the connectionless network layer protocol (CLNP) of the ATN. Other ATN equipments provide the SNICP for the ATN network layer entities.

SACOM asynchronous services provide for the transfer of CLNP protocol data units (PDUS) across the SACOM subnetwork. Asynchronous SACOM services provide a data transmission relay between an aircraft network layer entity and a ground-based network layer entity within the DLP/2. The asynchronous mode of operation is provisioned via a request reply mechanism between the aircraft and the SACOM Data Controller (SDC), which is located at the Area Control Facility (ACF). That is, the air-to-ground link resources supporting the ATS services of a particular sector (SACOM subnetwork) are statistically muliplexed between all aircraft participating in that sector. Access to the ATS services is scheduled by the ground-based SCC. Requests for ATS air-to-ground services can be transmitted as part of the periodic STS air-to-ground service or as a separate request burst. Request bursts times are a pooled resource shared by all participating aircraft. Access to a request slots is obtained via a slotted Aloha arbitration mechanism.

The following section provides a more detailed description of the two modes of operation (synchronous and asynchronous) provided within the SACOM data subnetwork.

SACOM Transmission Services

The abstraction of the set of capabilities available at the boundary of the SACOM subnetwork is defined as the SACOM data transmission service. The SACOM data transmission service supports two modes of operation:
Synchronous Transmission Services (STS).
Asynchronous Transmission Services (ATS).

STS services provide a dedicated A/G data transmission capability that can be interfaced to ground subnetworks in a manner that will support the multicasting of periodic reports to a list of ground ATC entities. These services are tailored to a data link layer transmission system interface to the GPS-based surveillance subsystem. STS service features include confirmed logon to the SACOM system, reserved transmission resources to support periodic position reporting capabilities and support to switchover from one sector to another in conjunction with voice communication switchover. This paired switchover of the STS communication services and the voice communication services supports a continuous surveillance reporting infrastructure across sector transitions. While the characteristics and operating parameters of the STS services have been tailored to the support of an active aircraft position reporting subsystem, they could be accessed by any airborne subsystem requiring a confirmed, periodic, reporting service.

ATS services provide a connection less mode service (CNLS) at the network access sublayer. These services are tailored to the support of the connectionless network layer protocol (CLNP) of the ATN, which provides the subnetwork independent convergence protocol (SNICP) for the ATN router on board the aircraft. ATS services provide for the transfer of CLNP protocol data units (PDSS) across an A/G subnetwork. These service support a data transmission service between an aircraft network layer entity and a ground-based network layer entity within the DLP/2.

Synchronous Transmission Services

SACOM STS services are based on a dedicated amount of transmission resource (reserved slots within a Synchronous Time Division Multiplexed superframe with a six-second duration) and ensure the user of a constant data rate. In ATN terminology, the STS service is a connection-mode service (CONS). Each aircraft participating in the SACOM subnetwork will have an active STS service association. The association is instantiated upon entry of the aircraft into the SACOM communication subsystem and remains active throughout its participation. STS service instantiation is initiated by the aircraft as part of normal SACOM network entry procedures. To acquire dedicated STS service burst time an aircraft contends for a reservation slot, using a slotted-Aloha process. The request slot is used to identify the new aircraft to the SACOM subsystem and initiate the provisioning of its service requirements.

The SACOM Data Controller (SDC), located within the subsystem master station, acts as a centralized system controller for its sector. The SDC manages access to and transmission assignments for all air-to-ground communications. It broadcasts a system orderwire as part of the SACOM ground-to-air communication stream. This system orderwire identifies available service resources and the location of STS service request slots within the SACOM transmission frame. An aircraft entering the sector must acquire the system orderwire, identify appropriate service reservation slots and transmit an entry request message. A reservation aloha procedure is used to transmit the system entry request. That is, the entering aircraft randomly selects from a group of advertised reservation slots to transmit a SACOM service request message. The SDC reads the airto-ground bursts for entry requests, schedules the new aircraft within the STS service subframe and sends his allocation as part of an orderwire transmission. Once this initial control handshake is performed the aircraft is enrolled in the dedicated SACOM STS services for that sector and a confirmed service association is instantiated. The SDC informs the network layer entity supporting the ATN routing function of the availability of the SACOM A/G subnetwork services upon instantiation of the SACOM STS service association.

Each STS service has one (1) to six (6) dedicated air-to-ground transmission bursts in each superframe. The size of a STS service burst is an integral multiple of the basic SACOM transmission slot (each slot has 156 encoded bits). Each STS burst includes a SACOM system header and a transparent user-data field. The SACOM system header of the STS mode service includes a guard band, an acquisition sequence, and a mechanism for relaying reservation requests for the CNLS mode service (described in the following subsection). The STS service is thus based on dedicated resources for each aircraft in a particular sector. All STS bursts are part of the connection oriented service and provide a dedicated reporting structure. The STS service association is maintained as long as the aircraft is reporting to that sector.

Asynchronous Services

Much of the traffic load to be offered to the aeronautical data link is expected to be bursty in nature. In cases where synchronous time-division multiplexing is used to support bursty data rate applications, many of the time slots in a frame can go unused. The SACOM communications subsystem uses a hybrid of dedicated and shared transmission resources. It supplements the STS service with a form of asynchronous TDM, also known as statistical TDM or intelligent TDM. The statistical multiplexing nature of this technique exploits the bursty nature of the offered traffic load by dynamically allocating time slots on demand. This SACOM service is referred to as Asynchronous Transmission Services (ATS).

ATS services provide a data link communication resource in which all aircraft in a particular sector share access to the same transmission resources (TDMA slots). In ATN terminology the ATS services are a connection-less mode service (CLNS). Access to the transmission resource (TDMA slots) is statistically multiplexed over time. SACOM exercises a reservation request/reply mechanism for contention resolution. The ATS service supports operations of the Connectionless Network Protocol (CLNP) as defined in ISO/IEC 8473-1 and accepted within the ATN Manual. The underlying subnetwork service provided by the SACOM ATS is accessed through the SACOM Subnetwork Access Protocol (SNAcP). The SACOM SNAcP supports SN-UNITDATA primitive and associated parameters are illustrated in FIG. 14.

This primitive conveys the source and destination subnetwork point of attachment addresses, subnetwork quality of service parameter, and a certain number of octets of user data. The SN-UNITDATA primitive is used to describe the abstract interface that exists between the Subnetwork Dependent Convergence Protocol (SDCP) functions (such as header compression) of the CLNP protocol machine and the SACOM subnetwork layer. That is, the SN-Userdata parameter is the service data unit assembled by the CLNP protocol machine. The source address and destination address parameters in the SN-UNITDATA primitive specify the SACOM points of attachment to aircraft and ACF real subnetworks. These are SACOM subnetwork addresses.

They are generated by the PDU Forwarding function of the CLNP protocol machine. Each ATS burst contains a SACOM system header and at least one SN-UNITDATA primitive. There is no dependency between various bursts. The SACOM modem reads each ATS burst independently and routes the SN-Userdata primitive based solely on the contents of the SACOM system header.

The SN-Userdata field is assumed to be an ordered multiple of octets, and will be transferred between the specified subnetwork points of attachment. The SACOM communication subsystem supports service unit sizes in integral multiples of 8 octets up to 1024 octets. (The nominal CLNP protocol data unit (PDU) size expected is 64 octets.) The SN-UNITDATA is the actual network layer PDU generated by the PDU composition function of the CLNP protocol machine. The address and QOS parameters are used by the SACOM subnetwork to deliver the SN-UNITDATA parameter to the appropriate destination in a transparent manner.

The ATS service is designed to efficiently support the datagram services envisioned for the ATN and its associated data link applications. Each datagram (CLNP protocol data unit) is passed as the SN-Userdata field of the SN-UNITDATA primitive. Associated with each connection-less transmission of the ATS service, certain measures of quality of service may be requested when the SN-UNITDATA primitive action is initiated. This quality of service parameter is used by the SACOM communication subsystem to schedule A/G transmission requests. The following parameters are currently accepted by the SACOM subnetwork processor within its scheduling algorithm:

1. Transit delay.
2. Priority.
3. Residual error probability.
4. Confirmed service.

Transit delay is defined as the elapsed time between the arrival of an SN-UNITDATA request at the SACOM SNAcP sublayer of the source node and the delivery of the corresponding SN-UNITDATA indication from the SNAcP entity to the SNDCP at the destination node.

The priority parameter is used by the SDC scheduler to adapt the normal first-come-first-serve queuing order for multiplexing the air-to-ground service requests. SACOM supports eight (8) priority levels. The number of priority levels and their weight in computing the transmission sequence for ATN support are negotiable. This parameter allows for the eventual incorporation of prioritized service levels within the subnetworks accessed by the ATN router.

The residual error probability defines the minimum desired error rate acceptable by the user for transmission of the associated SN-Userdata parameter. The expedited service parameters are used to denote the expedited mode of ATS services described in the following subsection.

The confirmed service parameter of the SACOM service primitive is used to define the service request as sufficiently importance to require guaranteed service delivery. This parameter is used to identify a request for acknowledged SACOM CLNS services. This special handling of the ATS service primitive is referred to as a Confirmed Transmission Services (CTS). CTS services have the same encoding characteristics as the normal ATS mode services. The difference is that processing of an CTS service primitive also includes an acknowledgement process. For air-to-ground services, receipt of the CTS SN-Userdata parameter is acknowledged in the next frame's orderwire. For ground-to-air services, a return burst is scheduled for acknowledgement of the CTS parameter receipt. The return acknowledgement is scheduled in one of the available service request slots in the air-to-ground ATS subframe.

RELATIONSHIP TO ATN PROTOCOL ARCHITECTURE

CLNP is implemented in software in the DLP/2, along with an A/G router which supports selection of the appropriate A/G subnetwork link. Special A/G subnetwork convergence functions (like header compression) are implemented as Subnetwork Independent Convergence Protocol (SNICP) functions in the DLP/2 element denoted the IDRP Manager Module. Specific A/G subnetworks, such as the Mode S data link, have additional SNDCF functions (such as a CLNP-to-X.25 conversion protocol) also implemented within the DLP/2. The SACOM SNDCF is assumed to be implemented in a similar fashion. That is, the SACOM subnetwork would not require any changes to the DLP/2 network layer protocol machines or SNICP functions. The SACOM interface software would be implemented as another SNDCF within the DLP/2, in a similar fashion to what is expected for a satellite A/G subnetwork.

It will be appreciated that while preferred embodiments have been described and illustrated, various modifications and adaptations of the invention will be apparent to those skilled in the art and still be within the spirit and scope of the invention as defined in the claims appended hereto.

What is claimed is:

1. Air traffic surveillance and communication system for air traffic controllers, comprising:

a plurality of around based first digital radio transceiver means, each first digital radio transceiver means being located in specific geographic sectors, respectively, and having a first frequency channel for supporting party-line digital voice, and a second frequency channel dedicated to supporting a digital data channel for down-linking dependent surveillance data and for both up-link and down-link data communications, said first and second frequency channels being paired such that each time a frequency change is commanded by the ground both the first and second frequency channels will be automatically tuned to a new air-ground frequency pair, a plurality of aircraft based second digital radio transceiver means, one located in each aircraft, each second radio transceiver having corresponding first and second frequency channels, a navigational data source on each aircraft, said navigational data source including GPS receiver means for producing aircraft navigation data selected from aircraft latitude, longitude, altitude, speed, heading and glide, and means coupling said navigational data source to the respective aircraft transceiver for transmission on said second channel to at least one of said plurality of around based first radio transceiver means, each said ground based first radio transceiver means having a communication controller for formatting up-link data and separating down-linked surveillance data and disseminating same to air traffic controllers in the sectors of said aircraft wherein each said digital radio transceiver means includes means for causing said digital radio transceiver to operate with a 10 kHz spacing.

2. Air traffic surveillance and communication system for air traffic controllers, comprising:

a plurality of ground based first radio transceiver means, each first digital radio transceiver means being located in specific geographic sectors, respectively, and having a first frequency channel for supporting party-line digital voice, and a second frequency channel dedicated to supporting a digital data channel for down-linking dependent surveillance data and for both up-link and down-link data communications, said first and second frequency channels being paired such that each time a frequency change is commanded by the ground both the first and second frequency channels will be automatically tuned to a new air-ground frequency pair, a plurality of aircraft based second digital radio transceiver means, one located in each aircraft, each second radio transceiver having corresponding first and second frequency channels, a navigational data source on each aircraft, said navigational data source including GPS receiver means for producing aircraft navigation data selected from aircraft latitude, longitude, altitude, speed, heading and glide, and means coupling said navigational data source to the respective aircraft transceiver for transmission on said second channel to at least one of said plurality of around based first radio transceiver means, each said ground based first radio transceiver means having a communication controller for formatting up-link data and separating down-linked surveillance data and disseminating same to air traffic controllers in the sectors of said aircraft wherein said GPS receiver means includes triply redundant GPS receivers and majority voting means to ensure high accuracy of said navigational data.

3. The air traffic surveillance and communication system defined in claim 2 wherein each said digital audio transceivers incorporate differential QPSK signal modulation.

4. The air traffic surveillance and communication system defined in claim 2 wherein each radio transceiver broadcast is by short transmission bursts having a guard band signal preamble and a management/user data field.

5. The air traffic surveillance and communication system defined in claim 2 wherein said system includes means for causing said transceiver to operate in a time division multiple access (TDMA) mode having super-frames with multiple subframes within each super-frame.

6. The air traffic surveillance and communication system defined in claim 5 wherein each said subframe has guard band and a synchronizing preamble followed by a predetermined data format.

7. Air traffic surveillance and communication method for air traffic controllers, comprising:

providing a plurality of ground based first radio transceiver means, each first digital radio transceiver means being located in specific geographic sectors, respectively, and having a first frequency channel for supporting party-line digital voice, and a second frequency channel dedicated to supporting a digital data channel for down-linking dependent surveillance data and for both up-link and down-link data communications, each said ground based first radio transceiver means having a communication controller for formatting up-link data and separating down-linked surveillance data and disseminating same to air traffic controllers in the sectors of said aircraft, providing a plurality of aircraft based second digital radio transceiver means, one located in each aircraft, each second radio transceiver having corresponding first and second frequency channels, a navigational data source on each aircraft, said navigational data source including means for producing aircraft navigation data selected from aircraft latitude, longitude, altitude, speed, heading and glide, and means coupling said navigational data source to the respective aircraft transceiver for transmission on said second channel to at least one of said plurality of ground based first radio transceiver means, pairing said first and second frequency channels such that each time a frequency change is commanded by the ground both the first and second frequency channels will be automatically tuned to a new air-ground frequency pair.

8. Air traffic surveillance and communication system for air traffic controllers, comprising:

a plurality of ground based first radio transceiver means, each first digital radio transceiver means being located in specific geographic sectors, respectively, and having a first frequency channel for supporting party-line digital voice, and a second frequency channel dedicated to supporting a digital data channel for down-linking dependent surveillance data and for both up-link and down-link data communications, said first and second frequency channels being paired such that each time a frequency change is commanded by the ground both the first and second frequency channels will be automatically tuned to a new air-ground frequency pair, a plurality of aircraft based second digital radio transceiver means, one located in each aircraft, each second radio transceiver having corresponding first and second frequency channels, a navigational data source on each aircraft, said navigational data source including GPS receiver means for producing aircraft navigation data selected from aircraft latitude, longitude, altitude, speed, heading and glide, and means coupling said navigational data source to the respective aircraft transceiver for transmission on said second channel to at least one of said plurality of around based first radio transceiver means, each said ground based first radio transceiver means having a communication controller for formatting up-link data and separating down-linked surveillance data and disseminating same to air traffic controllers in the sectors of said aircraft wherein said aircraft-based second digital radio transceiver means is adapted to receive all other aircraft-based transceiver transmission bursts in its vicinity and provide signals indicative of the latitude, longitude, altitude, speed heading and glide of other aircraft in said vicinity.

* * * * *